United States Patent
Watfa et al.

(10) Patent No.: US 11,558,724 B2
(45) Date of Patent: Jan. 17, 2023

(54) PRIORITY HANDLING FOR PROSE COMMUNICATIONS

(71) Applicant: InterDigital Patent Holdings, Inc., Wilmington, DE (US)

(72) Inventors: Mahmoud Watfa, Saint Leonard (CA); Guanzhou Wang, Brossard (CA); Saad Ahmad, Montreal (CA); Amir Helmy, Vancouver (CA); Ulises Olvera-Hernandez, London (GB)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/007,300

(22) Filed: Aug. 31, 2020

(65) Prior Publication Data
US 2020/0404472 A1 Dec. 24, 2020

Related U.S. Application Data

(63) Continuation of application No. 16/250,409, filed on Jan. 17, 2019, now Pat. No. 10,785,623, which is a
(Continued)

(51) Int. Cl.
*H04W 4/70* (2018.01)
*H04W 76/14* (2018.01)
(Continued)

(52) U.S. Cl.
CPC .............. *H04W 4/70* (2018.02); *H04W 4/023* (2013.01); *H04W 4/08* (2013.01); *H04W 4/80* (2018.02);
(Continued)

(58) Field of Classification Search
CPC ......... H04W 4/70; H04W 4/80; H04W 4/005; H04W 4/008; H04W 4/023; H04W 4/08;
(Continued)

(56) References Cited

U.S. PATENT DOCUMENTS 9,094,943 B2 7/2015 Klingenbrunn et al.
9,936,533 B2 4/2018 Kim et al.
(Continued)

FOREIGN PATENT DOCUMENTS

CN 104768122 A 7/2015
EP 2833694 A2 2/2015
(Continued)

OTHER PUBLICATIONS

3rd Generation Partnership Project (3GPP), C1-160844, "Add QCI and PPP in the TMGI Monitoring Request Procedure", Huawei, HiSilicon, 3GPP TSG-CT WG1 Meeting #96, Jeju (Korea), Feb. 15-19, 2016, 7 pages.
(Continued)

*Primary Examiner* — Junpeng Chen
(74) *Attorney, Agent, or Firm* — Condo Roccia Koptiw LLP

(57) ABSTRACT

Systems, methods, and instrumentalities are disclosed for priority handling for ProSe Communications. A relay wireless transmit/receive unit (WTRU) may act as a relay between the network and the remote WTRU. The relay WTRU may receive a temporary mobile group identity (TMGI) request message from a remote WTRU. The TMGI request message may include a TMGI, a ProSe per packet priority level associated with the TMGI, etc. The relay WTRU may receive an evolved multimedia broadcast multicast service (eMBMS) data packet from a network. The eMBMS may be associated with the TMGI. The relay WTRU may apply the received ProSe per packet priority level associated with the TMGI to the received eMBMS data packet. The relay WTRU may relay the eMBMS data packet to the remote WTRU based on the ProSe per packet priority level. The relay WTRU may forward the eMBMS data packet to the remote WTRU via a PC5 interface.

15 Claims, 18 Drawing Sheets

Related U.S. Application Data continuation of application No. 15/190,251, filed on Jun. 23, 2016, now Pat. No. 10,212,564.

(60) Provisional application No. 62/250,793, filed on Nov. 4, 2015, provisional application No. 62/203,681, filed on Aug. 11, 2015, provisional application No. 62/183,629, filed on Jun. 23, 2015.

(51) Int. Cl.
| | | |
|---|---|---|
| *H04W 4/80* | (2018.01) | |
| *H04W 4/02* | (2018.01) | |
| *H04W 4/08* | (2009.01) | |
| *H04W 72/00* | (2009.01) | |
| *H04W 72/04* | (2009.01) | |
| *H04W 72/10* | (2009.01) | |
| *H04W 8/00* | (2009.01) | |
| *H04W 72/12* | (2009.01) | |
| *H04W 88/04* | (2009.01) | |
| *H04W 8/18* | (2009.01) | |

(52) U.S. Cl.
CPC ......... *H04W 8/005* (2013.01); *H04W 72/005* (2013.01); *H04W 72/04* (2013.01); *H04W 72/10* (2013.01); *H04W 76/14* (2018.02); *H04W 8/186* (2013.01); *H04W 72/121* (2013.01); *H04W 88/04* (2013.01)

(58) Field of Classification Search
CPC ... H04W 8/005; H04W 72/005; H04W 72/04; H04W 72/10; H04W 72/121; H04W 76/14; H04W 76/023; H04W 88/04
See application file for complete search history.

(56) References Cited

U.S. PATENT DOCUMENTS

| | | | |
|---|---|---|---|
| 10,531,365 B2 * | 1/2020 | Kaur | H04W 48/10 |
| 2010/0254334 A1 | 10/2010 | Lin et al. | |
| 2012/0264369 A1 | 10/2012 | Wang et al. | |
| 2013/0044668 A1 | 2/2013 | Purnadi et al. | |
| 2014/0313974 A1 | 10/2014 | Chandramouli et al. | |
| 2015/0029866 A1 | 1/2015 | Liao et al. | |
| 2015/0078245 A1 | 3/2015 | Anchan | |
| 2015/0127733 A1 | 5/2015 | Ding et al. | |
| 2015/0326302 A1 * | 11/2015 | Stojanovski | H04W 12/80 370/315 |
| 2015/0327157 A1 * | 11/2015 | Al-Shalash | H04W 4/023 370/328 |
| 2016/0100305 A1 * | 4/2016 | Karampatsis | H04L 63/08 370/328 |
| 2016/0100353 A1 * | 4/2016 | Gleixner | H04W 48/02 370/329 |
| 2016/0165414 A1 * | 6/2016 | Lee | H04W 76/23 370/331 |
| 2016/0323777 A1 * | 11/2016 | Pan | H04W 76/14 |
| 2017/0034751 A1 | 2/2017 | Fujishiro et al. | |
| 2017/0041752 A1 * | 2/2017 | Baek | H04W 4/60 |
| 2017/0324754 A1 * | 11/2017 | Zhang | H04W 12/086 |
| 2018/0069664 A1 * | 3/2018 | Khoryaev | H04L 1/1854 |
| 2018/0077552 A1 | 3/2018 | Lee et al. | |
| 2018/0077618 A1 * | 3/2018 | Lee | H04W 40/22 |
| 2018/0084442 A1 * | 3/2018 | Lee | H04L 5/0048 |
| 2018/0098370 A1 * | 4/2018 | Bangolae | H04W 88/04 |
| 2018/0115931 A1 | 4/2018 | Lee et al. | |
| 2018/0115937 A1 | 4/2018 | Poitau et al. | |
| 2018/0124674 A1 * | 5/2018 | Vutukuri | H04W 36/30 |
| 2018/0146494 A1 * | 5/2018 | Khoryaev | H04W 76/23 |
| 2020/0154290 A1 * | 5/2020 | Lee | H04W 40/24 |

FOREIGN PATENT DOCUMENTS

| | | |
|---|---|---|
| EP | 2833694 A3 | 4/2015 |
| KR | 10-2012-0000576 A | 1/2012 |
| KR | 10-2014-0023988 A | 2/2014 |
| KR | 20150048180 A | 5/2015 |
| RU | 2476029 C2 | 2/2013 |
| WO | 2014/133356 A1 | 9/2014 |
| WO | 2015/005626 A1 | 1/2015 |
| WO | 2015/064074 A1 | 5/2015 |
| WO | 2017/001581 A1 | 1/2017 |
| WO | 2017/026760 A1 | 2/2017 |

OTHER PUBLICATIONS

3rd Generation Partnership Project (3GPP), S2-143076, "ProSe UE to Network Relay Supporting Unicast and Multicast", Ericsson, SA WG2 Meeting #105, Sapporo, Japan, Oct. 13-17, 2014, pp. 1-7.

3rd Generation Partnership Project (3GPP), S2-151573, "ProSe Priority", Qualcomm Incorporated, Alcatel-Lucent, Intel, U.S. Department of Commerce, LG Electronics, SA WG2 Meeting #109, Fukuoka, Japan, May 25-29, 2015, pp. 1-5.

3rd Generation Partnership Project (3GPP), S2-151751, "LS Reply on ProSe Priorities", SA2, SA WG2 Meeting #109, Fukuoka, Japan, May 25-29, 2015, 2 pages.

3rd Generation Partnership Project (3GPP), S2-151776, "[Draft] LS reply on ProSe Priorities", SA2, SA WG2 Meeting #109, Fukuoka, Japan, May 25-29, 2015, 2 pages.

3rd Generation Partnership Project (3GPP), S2-151991, "Conclusion for ProSe UE-Network Relays", Samsung, SA WG2 Meeting #109, Fukuoka, Japan, May 25-29, 2015, pp. 1-8.

3rd Generation Partnership Project (3GPP), S2-152873, "ProSe Per Packet Priority Assignment for MBMS Traffic in UE2NW Relay", Samsung, Qualcomm Incorporated, InterDigital, Huawei, 3GPP TSG-SA WG2 Meeting #110AH, Sophia Antipolis, France, Aug. 31-Sep. 3, 2015, pp. 1-4.

3rd Generation Partnership Project (3GPP), S2-153305, "Solution for ProSe Priority in PC5 Unicast Case", SA WG2 Meeting #111, Chengdu, China, Oct. 19-23, 2015, 5 pages.

3rd Generation Partnership Project (3GPP), S2-160472, "Addition of ProSe Per-Packet Priority & QCI in the TMGI Monitoring Request Procedure", InterDigital, SA WG2 Meeting #113, Saint Kitts, KN, Jan. 25-29, 2016, 3 pages.

3rd Generation Partnership Project (3GPP), S2-160552, "Addition of ProSe Per-Packet Priority & QCI in the TMGI Monitoring Request Procedure", InterDigital, SA WG2 Meeting#113, Saint Kitts, KN, Jan. 25-29, 2016, 4 pages.

3rd Generation Partnership Project (3GPP), Version 1.0.0, Report of SA WG2 Meeting #109, Secretary of SA WG2, SA WG2 Meeting #109, Fukuoka, Japan, May 25-29, 2015, pp. 1-188.

3rd Generation Partnership Project (3GPP), TR 23.713 V1.4.0, "Technical Specification Group Services and System Aspects, Study on Extended Architecture Support for Proximity-based Services (Release 13)", Jun. 2015, pp. 1-85.

3rd Generation Partnership Project (3GPP), TS 23.303 V12.2.0, "Technical Specification Group Services and System Aspects, Proximity-based Services (ProSe), Stage 2 (Release 12)", Sep. 2014, pp. 1-61.

3rd Generation Partnership Project (3GPP), Version 0.1.0, "Draft Report of SA WG2 Meetings #109", Secretary of SA WG2, SA WG2 Meeting #109, Fukuoka, Japan, May 25-29, 2015, pp. 1-188.

* cited by examiner

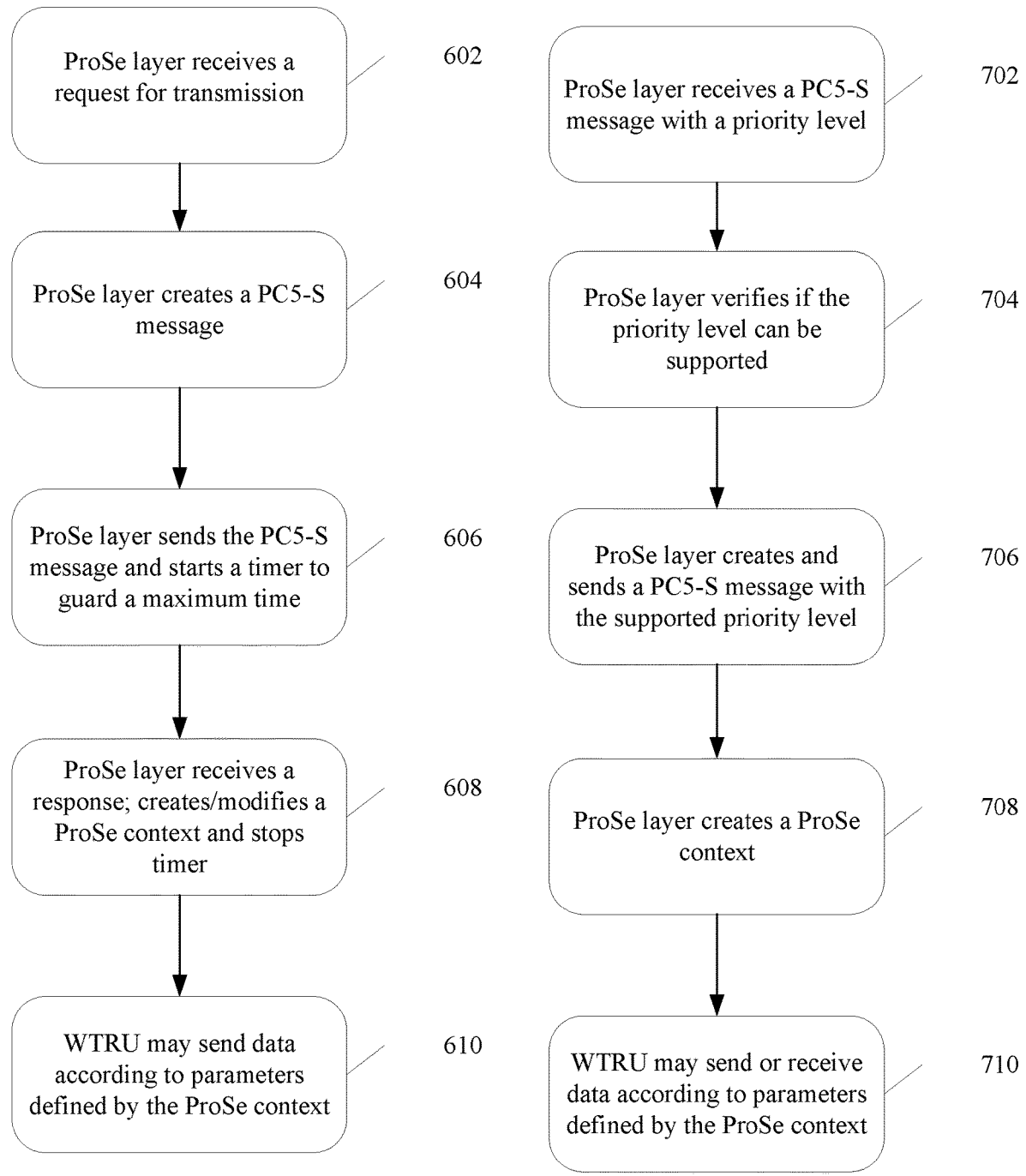

PRIORITY HANDLING FOR PROSE COMMUNICATIONS

CROSS REFERENCE TO RELATED APPLICATIONS

This application is a continuation of U.S. non-provisional application Ser. No. 16/250,409, filed Jan. 17, 2019, which is a continuation of U.S. non-provisional application Ser. No. 15/190,251, now Issued U.S. Pat. No. 10,212,564, which claims the benefit of U.S. Provisional Patent Application Nos. 62/183,629 filed on Jun. 23, 2015, 62/203,681 filed on Aug. 11, 2015, and 62/250,793 filed on Nov. 4, 2015, the contents of which are hereby incorporated by reference herein.

BACKGROUND

A relay wireless transmit/receive unit (WTRU) may provide connectivity to a remote WTRU that may be out of coverage of a network. The relay WTRU may communicate with the remote WTRU via a PC5 interface. Proximity services (ProSe) may enable a direct communication between the relay WTRU and the remote WTRU using, for example, LTE radio interfaces. Unlike communications over a Uu interface between a relay WTRU and an eNodeB, ProSe communications over the PC5 interface between a relay WTRU and a remote WTRU may not support quality of service (QoS). PC5 interface may support ProSe per packet priority. A relay WTRU may need mechanisms to determine a ProSe per packet priority value.

SUMMARY

Systems, methods, and instrumentalities are disclosed for priority handling for ProSe communications. A relay wireless transmit/receive unit (WTRU) may act as a relay between the network and the remote WTRU. The relay may receive a temporary mobile group identity (TMGI) request message from a remote WTRU. The TMGI request message may include a TMGI, a ProSe per packet priority level associated with the TMGI, etc. The TMGI request message may be a PC5-S message. The relay WTRU may receive, from a network, an evolved multimedia broadcast multicast service (eMBMS) data packet associated with the TMGI. The relay WTRU may detect the TMGI, the relay is configured to monitor. The WTRU may apply the received ProSe per packet priority level associated with the TMGI to the received eMBMS data packet. The relay WTRU may relay the eMBMS data packet to the remote WTRU based on the ProSe per packet priority level. The relay WTRU may send the eMBMS packet over the PC5 interface. The relay WTRU may act as a relay between the network and the remote WTRU.

A remote WTRU may receive a service announcement from an application server (AS). The service announcement may include a TMGI and a priority level associated with the TMGI. The remote WTRU may determine a ProSe per packet priority level associated with the TMGI. For example, the remote WTRU may derive the ProSe per packet priority level from the received priority level associated with the TMGI. The remote WTRU may send a TMGI message to a relay WTRU. The TMGI message may be sent using a PC5-S transmission. The PC5-S transmission may be sent using a pre-configured ProSe per packet priority level. The PC5-S transmission may be sent using a priority level is received from a network node (e.g., a mobile management entity (MME) or a ProSe function). The TMGI message may include the TMGI and the determined ProSe per packet priority level associated with the TMGI. The ProSe per packet priority level associated with the TMGI may be indicated using one of eight possible values. The remote WTRU may receive, from the relay WTRU, an evolved multimedia broadcast multicast service (eMBMS) data packet associated with the TMGI.

The remote WTRU may include a lower layer (e.g., a PC5 access stratum layer) and an upper layer (e.g., a PC5 ProSe layer). The lower layer of the remote WTRU may receive one or more ProSe per packet priorities from the upper layer. The lower layer may receive one or more protocol data units (PDUs) from the upper layer. The lower layer may prioritize the PDUs received from the upper layer based on the ProSe per packet priorities received from the upper layer. The ProSe per packet priority values may be independent of destination addresses. The PDUs with different priorities may be served in order. A ProSe per packet priority associated with a PDU with lower number may have higher priority than a ProSe per packet priority associated with a PDU with higher number.

BRIEF DESCRIPTION OF THE DRAWINGS

FIG. 6 illustrates an example of a WTRU or a WTRU ProSe layer sending a PC-5 message with priority information.

FIG. 7 illustrates an example of a WTRU or a WTRU ProSe layer receiving and processing a PC-5 message with priority information.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
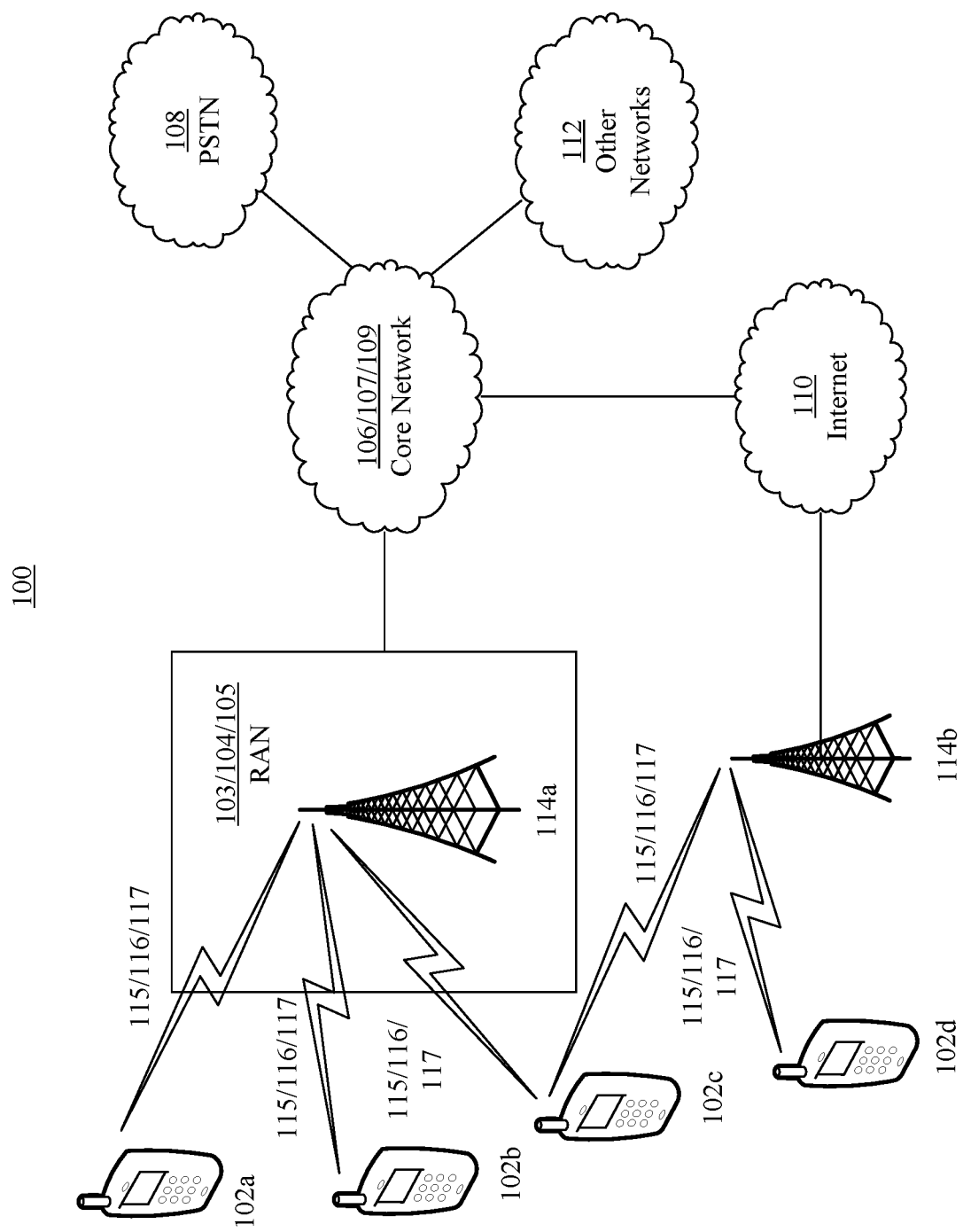
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs), e.g., WTRUs, 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in some embodiments, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In some embodiments, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
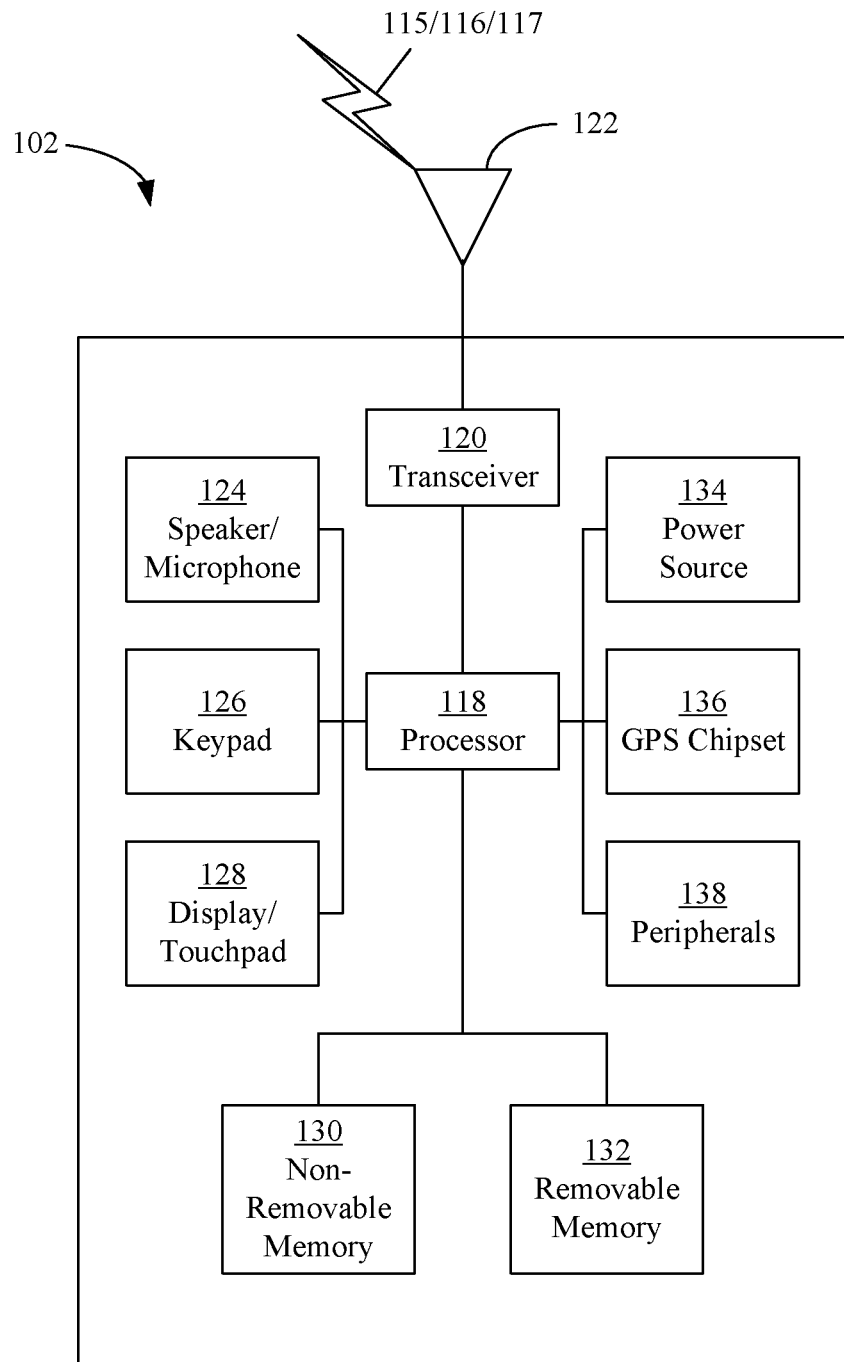
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in some embodiments, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in some embodiments, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination implementation while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
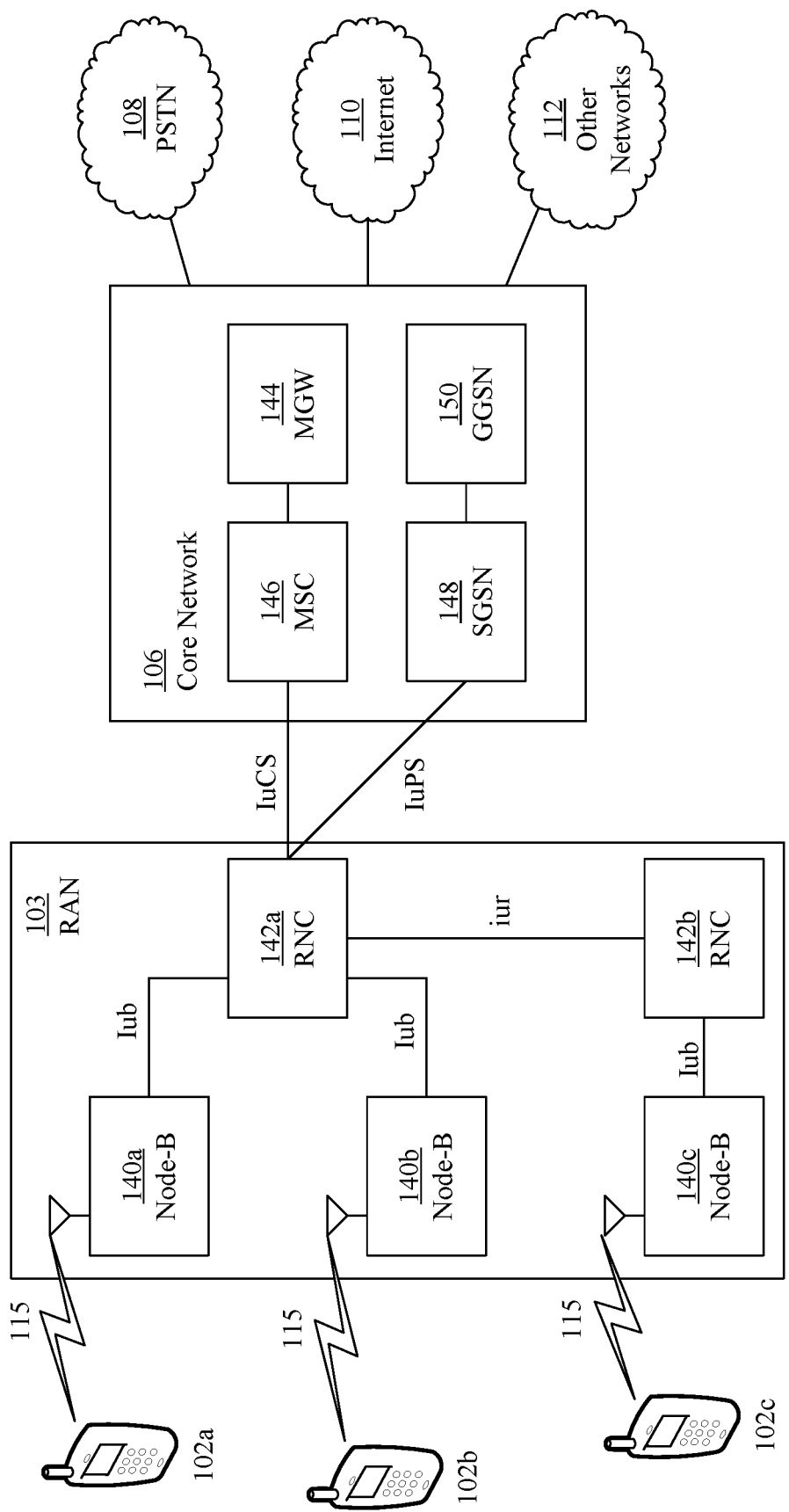
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
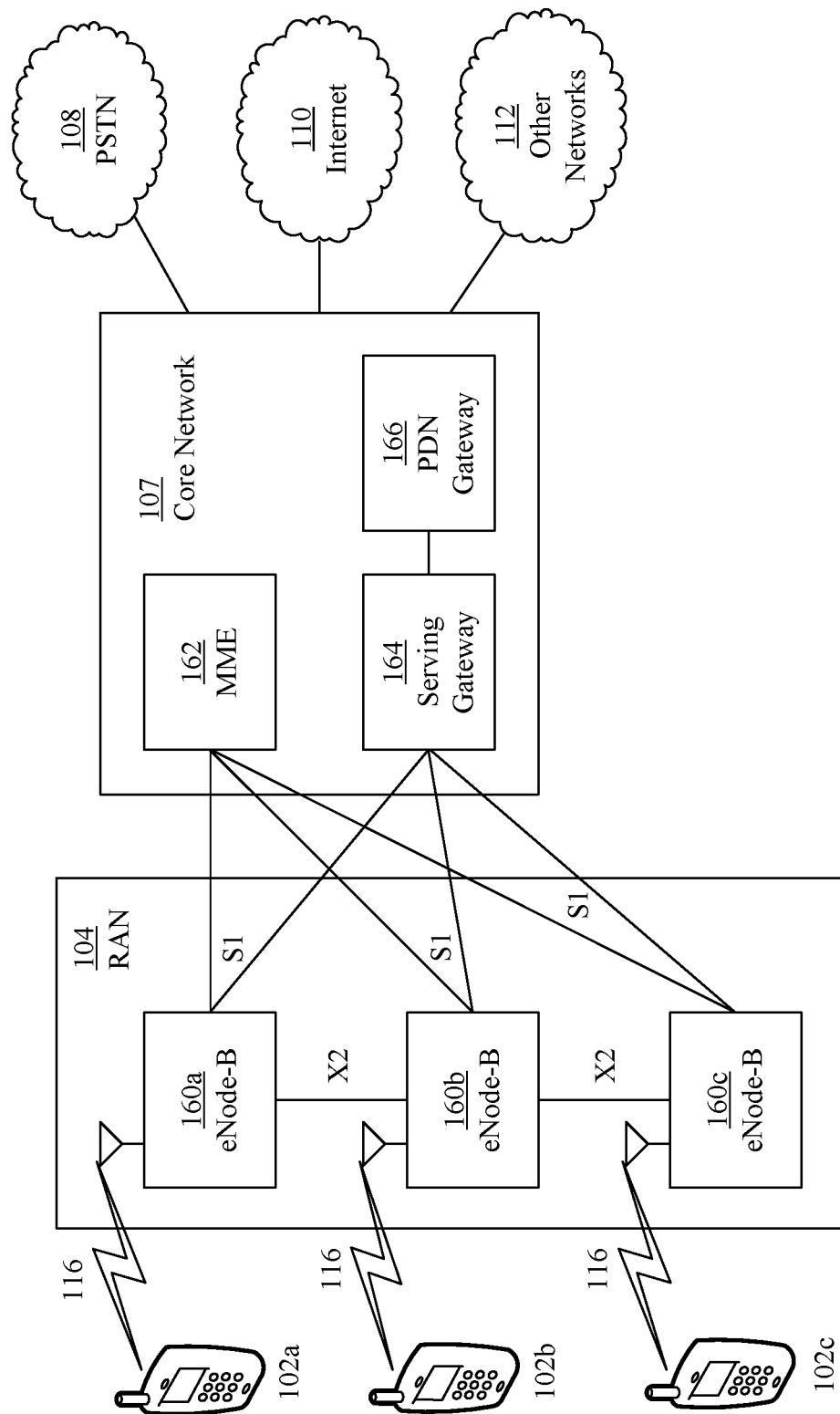
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In some embodiments, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink (UL) and/or downlink (DL), and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an Si interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the Si interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
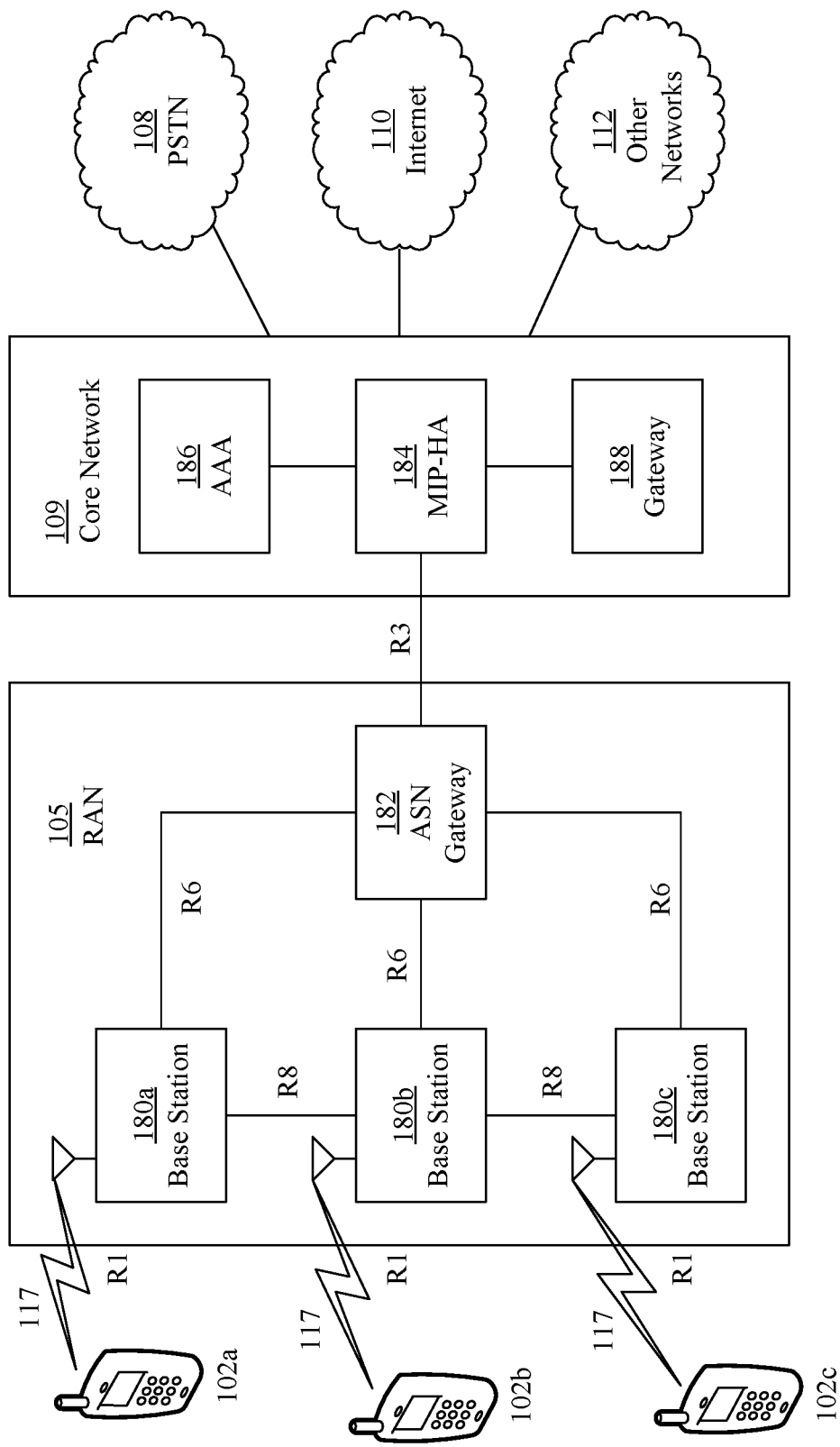
FIG. 1E is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In some embodiments, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Figure 2:
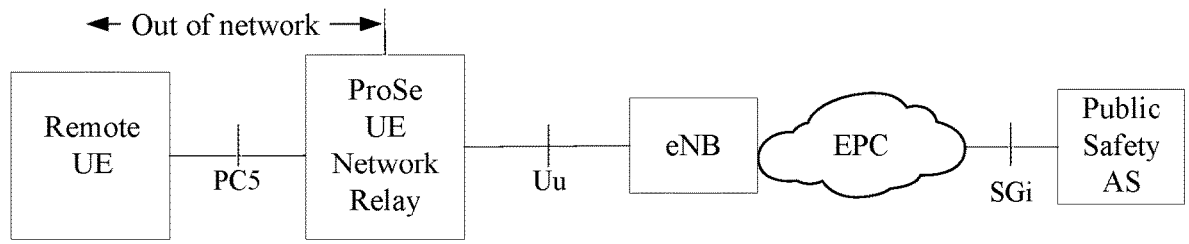
FIG. 2 illustrates an example of a WTRU-to-Network relay architecture.

A ProSe WTRU-to-Network relay service may be provided. A WTRU (e.g., a ProSe WTRU-to-Network relay) may act as a relay to a remote WTRU. The relay WTRU may provide IP connectivity service to one or more remote WTRUs that may be out of network coverage. A ProSe WTRU-to-Network relay may be referred to as a relay WTRU. A relay WTRU may provide unicast and/or multicast services to one or more remote WTRUs. FIG. 2 illustrates an exemplary ProSe WTRU-to-Network relay architecture. As illustrated in FIG. 2, a relay WTRU may act like a layer 3 (L3) router. The relay WTRU may provide a unicast service and/or a broadcast service to the remote WTRU. The relay WTRU may perform L3 forwarding for one or more of uplink (UL) traffic or downlink (DL) traffic.

A relay WTRU may relay MBMS traffic that it may detect from a network. A remote WTRU may indicate to a relay WTRU the MBMS data the remote WTRU may be interested in. The remote WTRU may provide to the relay WTRU a TMGI associated with the interested MBMS data. The relay WTRU may broadcast MBMS data (e.g., related to the indicated TMGI). The MBMS data may be broadcasted over a PC5 communication plane.

Proximity services (ProSe) may enable direct communication between devices using an LTE radio interface (e.g., an Evolved UMTS Terrestrial Radio Access Network (E-UTRAN) interface). Communication over an Evolved Packet Core (EPC) may support Quality of Service (QoS). ProSe may not support quality of service (QoS). ProSe may support priority handling of IP packets sent over a direct link. An IP packet may be associated with a priority level. A priority level may indicate how the access stratum in a device may treat a packet (e.g., based on a priority value) during transmission. ProSe priority may be referred to as ProSe per packet priority (PPP or PPPP) or PC5 ProSe priority or PC5 priority.

A priority of a ProSe communication transmission may be selected, for example, by an application layer. The ProSe communication transmission may be selected based on one or more criteria. Interaction between an application layer and one or more ProSe communication lower layers may be neutral to how a ProSe WTRU may access a medium, for example, using a scheduled mode or an autonomous transmission mode.

Upper layers in a remote WTRU may provide a ProSe per packet priority from a range of possible values to one or more lower layers. For example, ProSe per packet priority value may be provided when requesting a transmission, such as one-to-one or one-to-many communication. ProSe per packet priority of a transmission may be independent of a destination address.

An access stratum layer may use a ProSe per packet priority associated with a protocol data unit received from upper layers, for example, to prioritize multiple intra-WTRU transmissions and inter-WTRU transmissions. An intra-WTRU transmission may be protocol data units associated with different priorities awaiting transmission inside the same WTRU.

Priority queues (e.g., intra-WTRU and inter-WTRU priority queues) may be served in a priority order. For example, a scheduler in WTRU or eNB may serve packets associated with ProSe per packet priority N before serving packets associated with priority N+1. A lower number may be designate a higher priority. A medium may be accessed in scheduled or autonomous transmission modes, for example, while respecting a ProSe per packet priority value selected by applications. One or more priority levels (e.g., eight priority levels) may be supported for a ProSe per packet priority, for example, to support a wide range of applications.

E-UTRAN may be able to validate and/or limit, per WTRU, a maximum ProSe per packet priority that may be granted to a WTRU. A framework for defining mapping of application traffic types to one or more values of ProSe per packet priority may be defined.

A signaling plane may be provided in ProSe communication. Signaling (e.g., ProSe related signaling) may be transmitted, for example, to negotiate one or more parameters (e.g., IP address, port number, parameters for MBMS data) to be used for transmission of IP data or user plane data. The ProSe related signaling may be transmitted before a ProSe communication session is initiated between devices. Transport of a ProSe Signaling Protocol may be referred to as PC5-S. PC5-S transmission may be carried over IP or PDCP.

Figure 3:
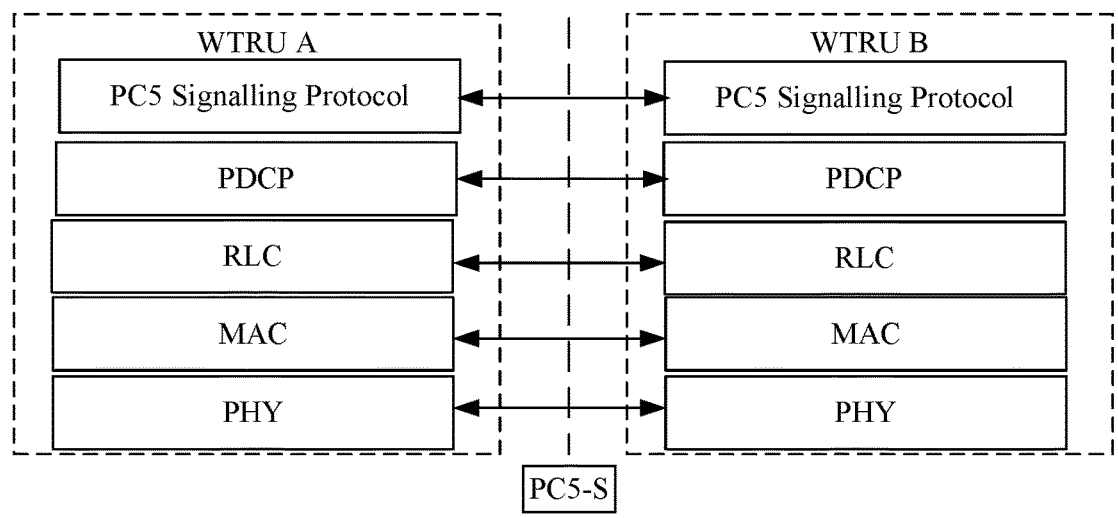
FIG. 3 illustrates an example of a PC5-S protocol stack.

FIG. 3 illustrates an example of a PC5 signaling (PC5-S) protocol stack. A packet data convergence protocol (PDCP) header (e.g., a service data unit (SDU) type field in a PDCP header) may be used, for example, to discriminate between IP packets, allocation and retention priority (ARP), and PC5-S signaling protocol. Packets that carry signaling (e.g., using PC5-S protocol) may be handled in a manner similar to the handling of user plane packets. Packets that carry signaling may be subject to the same priority treatment. A PPP may be associated with each of the PC5-S protocol data units (PDUs).

A remote WTRU may be out of coverage of a network. A remote WTRU may use the connectivity of a WTRU-to-Network relay. The WTRU-to-Network relay may act as a Layer 3 router, e.g., as shown in FIG. 2. There may be one or more problems handling priority for relayed traffic, e.g., with respect to handling priority at a WTRU-to-Network relay for unicast traffic or MBMS data, handling priority for PC5-S traffic.

A remote WTRU may receive a priority associated with a packet that it may transmit over a PC5-U interface. The remote WTRU may receive the priority (e.g., PPP) from an application server. The priority may be provided by the application layer of the WTRU to one or more of its lower layers. Such application layer may be absent in a relay WTRU. The relay WTRU may lack an ability to handle the priority of an IP packet it may receive from the network in a downlink (DL) direction. The IP packet may be destined to one or more remote WTRUs, e.g., over the PC5-U interface. A WTRU behavior may indicate how a relay WTRU handles the concept of PPP, such as treatment of packets to be transmitted on the PC5-U towards one or more remote WTRUs.

A relay WTRU may receive data from a remote WTRU. The relay WTRU may not have information about the priority, the remote WTRU may have used while sending the packet. One way of obtaining such information may be by pre-configuring the relay WTRU and the remote WTRU. Such information may enable the relay WTRU to forward received packets from a remote WTRU (e.g., over PC5-U) on an appropriate evolved packet system (EPS) bearer that is associated with a quality of service (QoS).

A relay WTRU may support relaying of eMBMS data. A relay WTRU may receive eMBMS data that may be of interest to remote WTRUs, e.g., on a broadcast channel. A relay WTRU may forward data of interest to remote WTRUs on a PC5-U plane. Relay WTRU may relay multiple eMBMS sessions concurrently. A relay WTRU may differentiate the priority between a packet of a first eMBMS session (e.g., associated with TMGI 1) and a second eMBMS session (e.g., associate with TMGI 2). A Relay WTRU may relay eMBMS sessions and unicast sessions concurrently. Priority may be differentiated between an eMBMS session and a unicast session.

PC5-S messages between a remote WTRU and a relay WTRU may be utilized for a variety of reasons, for example, establishing a one-to-one link, obtaining IP addresses, etc. Systems, methods, and instrumentalities may be provided for associating a PPP may be with PC5-S traffic that may not be generated by the application layer of a remote WTRU.

A WTRU with an active IP session with an AS may lose coverage from a network in which the AS may reside. A WTRU may connect to a relay WTRU. The relay WTRU may designate the WTRU a remote WTRU. The remote WTRU may obtain a different IP address that may be a link local IPv4 address. A WTRU session may not be seamlessly resumed/transitioned, for example, when the IP address changes. The remote WTRU may contact the application server, for example, to inform the application server about the remote WTRUs IP point of presence, which may be the IP address of the relay WTRU. Systems, methods, and instrumentalities may be provided for the remote WTRU to obtain the IP address of a relay WTRU (e.g., which the remote WTRU may not have information about) and pass the obtained IP address on to the application server, e.g., to make the session with the application server seamless. Identification of the relay WTRU may be useful for the AS to track the number and identities of the remote WTRUs that may be served by a relay WTRU. A remote WTRU may report the Cell ID of a relay WTRU without informing which relay WTRU is serving remote WTRUs. There may be several relay WTRUs in a cell.

Figure 4:
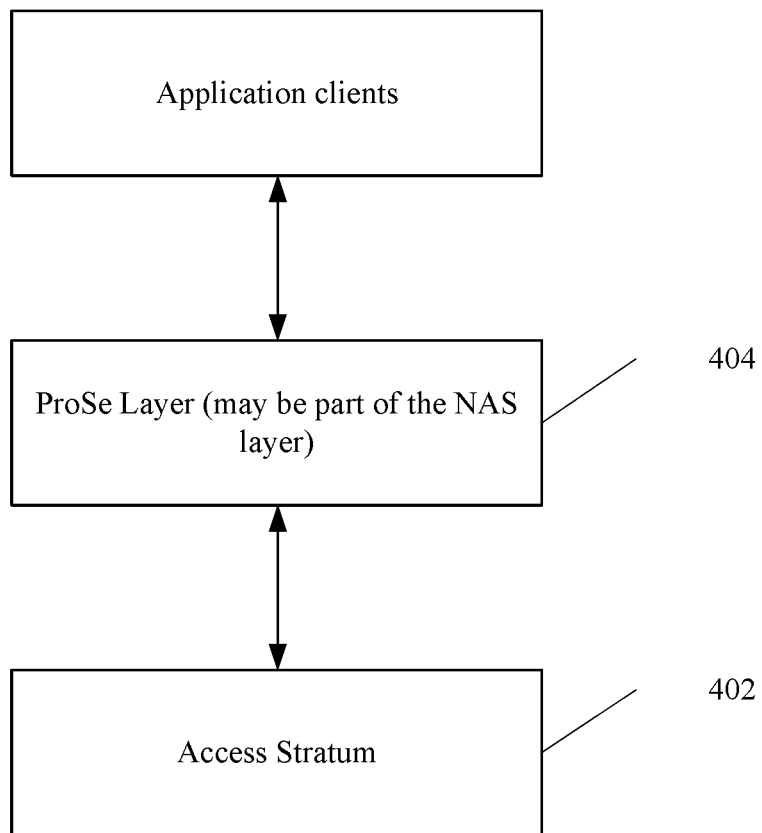
FIG. 4 illustrates an example of a WTRU ProSe layer.

Priority handling (e.g., for unicast traffic) at a WTRU-to-Network relay may be provided. A WTRU may maintain a context, for example, indicating a ProSe link with other WTRUs. A context may be maintained, for example, in a ProSe layer. FIG. 4 illustrates an example of a ProSe layer in a WTRU. As illustrated in FIG. 4, a ProSe layer 404 may, for example, be a separate layer above the access stratum 402 or a part of the NAS entity. A ProSe layer may refer to the NAS entity in the WTRU or it may refer to a new separate layer or entity in the WTRU.

A WTRU may maintain information for each of the source and destination address, such as a layer 2 (L2) destination address or layer 3 (L3) destination IP address, or a pair of destination L2 address and destination IP address. Information maintained may include one or more of a list of logical channel ID, a priority level of each ID, a keep alive timer, a set of security parameters, a maximum level of priority, a mapped EPS bearer, ProSe link IP address and port numbers, a TMGI or cell ID, or other parameters for exchange between WTRUs.

A list of logical channel ID and a priority level may be used for each ID. A priority level may be a PPP or a derived or mapped priority level. A keep alive timer may be used for a ProSe session and/or for each logical channel ID. A set of security parameters may be used for communication with a destination address.

A maximum level of priority permitted may be used for a destination address or WTRU or for an application. A maximum level may be pre-configured in a WTRU. The maximum level may be obtained from the ProSe Function, the application server or from a peer WTRU. The maximum level may be obtained via a PC5-S interface, for example, as part of negotiation to establish a ProSe link.

A mapped EPS bearer may indicate the packets that may be forwarded. A mapped EPS bearer may apply, for example, when a relay WTRU receives packets on a PC5 interface from a remote WTRU, and determines to forward the received packets on a logical channel ID to an EPS bearer ID. A WTRU may maintain a mapping, for example, between a (logical channel ID, priority level) and an (EPS bearer ID, QoS parameters of the EPS bearer). Such mapping may be part of a ProSe context. A source/destination IP address, source/destination port numbers used on the ProSe link and/or on the EPS bearer may be part of a ProSe context.

A TMGI or a cell ID or other parameters that may be exchanged between WTRUs, and may be part of a ProSe context. These parameters may be associated with a ProSe link that may be used to carry messages for the exchange of parameters.

As illustrated in FIG. 4, the ProSe layer 404 may be a separate layer above the access stratum layer 402 or it may be part of the NAS entity. The ProSe layer 404 may be referred to as the NAS entity in the WTRU or a new entity in a WTRU.

Figure 5:
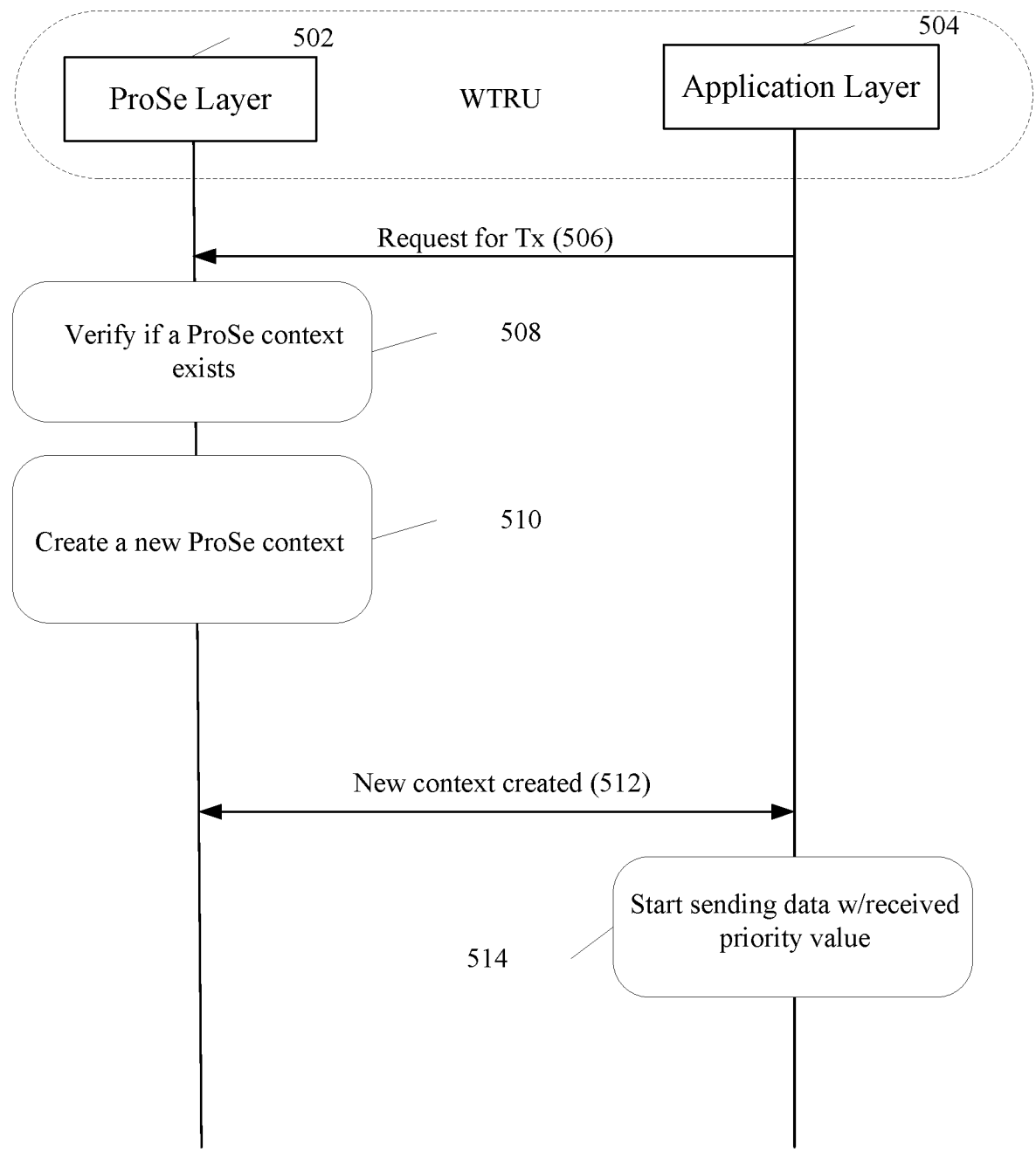
FIG. 5 illustrates an example of a WTRU ProSe layer when a Transmission (Tx) with a priority level (e.g., a new priority level) is requested, e.g., with or without a specific destination address.

User plane traffic within a WTRU may pass from an application client layer to an access stratum layer. FIG. 5 illustrates an example of a WTRU or ProSe layer when a transmission (Tx) with a new priority level may be requested, for example, with or without a specific destination address. As illustrated in FIG. 5, an application layer 504 may inform the ProSe layer 502 about a new priority for its packets, for example, when the application layer initiates a new transmission with a new priority level. At 506, the application layer 504 may send a request for transmission to a certain destination with the new priority level. At 508, the ProSe layer 502, for example, upon reception of a request to send a message 506, may verify whether there is a logical channel that may be using the same priority for the destination address. The ProSe layer 502 may verify, for example, whether the packet is an IP packet or is being used for other purposes, such as for a TMGI monitoring request. The ProSe layer 502 may send a message using a logical channel, for example, when there is a logical channel with the same priority that is being used for the destination address. If no context, or a logical channel with the same priority, and optionally for the required destination exists, at 510, the ProSe layer may create a new context for a transmission or priority with a context. For example, the ProSe layer may create a new context when a logical channel with the same priority is not being used for the destination address. At 512, the ProSe layer 502 may inform the application layer 504 that the logical channel with the requested priority has been granted. For example, the ProSe layer 502 may inform the application layer 504 upon the confirmation of the transmission by the lower layers or upon the reception of a response by the ProSe layer 502 from its peer in another WTRU. At 514, the client in the application layer 504 in a WTRU may start sending data using the priority value received from the ProSe layer.

A ProSe layer in the WTRU may delete a ProSe context. For example, the WTRU may delete a ProSe context when a lower layer confirms that a ProSe link may no longer be feasible to maintain. The ProSe layer in the WTRU may delete a ProSe context, for example, when a message is received to release a session between WTRUs, e.g., for a specific logical channel identity or for a specific priority. A WTRU may delete a ProSe context, for example, when a message is received indicating that a logical channel identity or a certain priority level is no longer supported or cannot be supported by a peer WTRU or one or more lower layers. A ProSe layer in the WTRU may inform the application layer or the higher layers, for example, about the deletion of the ProSe context. A ProSe layer in the WTRU may inform the application layer about an implicit release of a logical channel or a link with the specific priority as a result of the deletion of the context.

Systems, methods, and instrumentalities to dynamically indicate priority between WTRUs may be provided. A WTRU may dynamically inform its peer about the priority of a ProSe bearer or a ProSe link that may be or is established between WTRUs. The WTRU (e.g., a remote WTRU) and its peer (e.g., a relay WTRU) may be a pair of WTRUs engaged in a ProSe communication session.

A WTRU may send a PC5-S message, for example, to inform its peer about the priority associated with a ProSe link or with a ProSe bearer or with the new logical channel that is to be created. An originating WTRU may send a new PC5-S message to its peer WTRU, for example, for a (e.g., every) session to be initiated or packet to be transmitted with a different priority but with same (source L2, destination L2) address pair. The originating WTRU may inform the peer WTRU about the priority associated with a packet or a logical channel that may be configured. A WTRU (e.g., the ProSe layer in the WTRU) may send a PC5-S message when a ProSe context (e.g., a new ProSe context) is created. The PC5-S message may include priority information, for example, a maximum priority level that may be supported by a WTRU (e.g., priority level per application).

The PC5-S message may include a source L2 ID (or a source higher layer application ID) along with a logical channel identity (LCID). The target peer WTRU may identify the corresponding logical channel to which the indicated priority pertains. The LCID of a logical channel may be unique in one source/destination association. A WTRU (e.g., ProSe layer of the WTRU) may include a timer that may define the period to transmit keep alive messages associated with a corresponding logical channel and the related priority. A WTRU may start a timer that may guard the duration in which a response may be expected. The WTRU may retransmit the PC5-S message, for example, if a response is not received within the duration. The WTRU may stop the associated timer and considers the procedure as successfully completed, for example, if a response is received.

FIG. 6 illustrates an example of a WTRU or ProSe layer sending a PC5-S message with priority information. As illustrated in FIG. 6, at 602, a ProSe layer may receive a request for transmission, to a destination, using a priority level (e.g., a new priority level). At 604, the ProSe layer may generate a PC5-S message to be transmitted to the indicated destination. The message may include information about the ProSe context parameters, for example, priority associated with a session or a logical channel. At 606, the ProSe layer may send the generated PC5-S message. The ProSe layer may start a timer to guard the maximum time within which a response should be received. At 608, the ProSe layer may receive a response. At 608, the ProSe layer may create and/or modify a ProSe context, and stop the timer. The ProSe layer may inform other layers (e.g., the layers above the ProSe layers) about the ProSe context creation and/or modification. At 610, the WTRU may start sending data according to the parameters defined by the ProSe context for one or more of a destination address, a logical channel ID, or an application ID.

FIG. 7 illustrates an example of WTRU (e.g., ProSe layer of a WTRU) that may receive a PC5-S message with priority information. As illustrated in FIG. 7, at 702, the ProSe layer of a WTRU may receive a PC5 message with a priority level for a ProSe session. The ProSe layer may receive the priority information for a logical channel ID, a source (e.g. layer 2 or IP) address and/or an application ID. At 704, the WTRU may verify whether a priority level can be supported, e.g., for an application ID. The WTRU may be pre-configured with different levels of priority that can be supported, e.g., per application or per identity of the peer WTRU, such as ProSe WTRU ID, or L2 ID or IP address used by the peer WTRU.

A relay WTRU may verify whether an indicated priority level may be correspondingly supported on an EPS bearer. The relay WTRU may determine a mapping to an EPS bearer to a priority level. EPS QoS parameters, such as QoS class identifier (QCI), may be derived. For example, the EPS QoS parameters may be derived to support a priority. A decision may be made whether a new EPS bearer with such QoS profile may be established or an existing EPS bearer may be modified and/or updated. At 706, the WTRU may create and/or send a response message, for example, to indicate a priority level that may be supported. A priority level indicated may be the same or a different priority level. A WTRU may indicate a cause code, for example, to indicate why a priority level, provided with the response message, has been altered. As an example, a requested priority level may not be correspondingly supported over the evolved packet system (EPS) bearer. A relay WTRU may send a PC5-S response to indicate that the session to be established may be supported with a lower priority level, for example, to indicate that the EPS bearers that are currently active do not support the priority level requested by the remote WTRU. A relay WTRU may provide a cause code. A session to be established may be identified, for example, by a logical channel ID, application ID, a pair of (source, destination) L2/IP addresses and/or a set of the listed parameters.

At 708, the WTRU receiving the PC5-S message to start a new session may create a ProSe context. The WTRU that receives a PC5-S message to start a new session may be determined by a logical channel ID and/or for a specific source and destination address. A ProSe context may be created, for example, after a message is responded to with a new PC5-S response message. A WTRU may provide other parameters in a response, such as a timer that may be used to define when keep alive messages may be sent, for example, to maintain an active state of a ProSe context with associated context parameters. An expiration of the keep alive timer before a new refresh message is received may result in a WTRU deleting the ProSe context. At 710, the WTRU may start sending and/or receiving data according to the parameters defined by the ProSe context.

Figure 8:
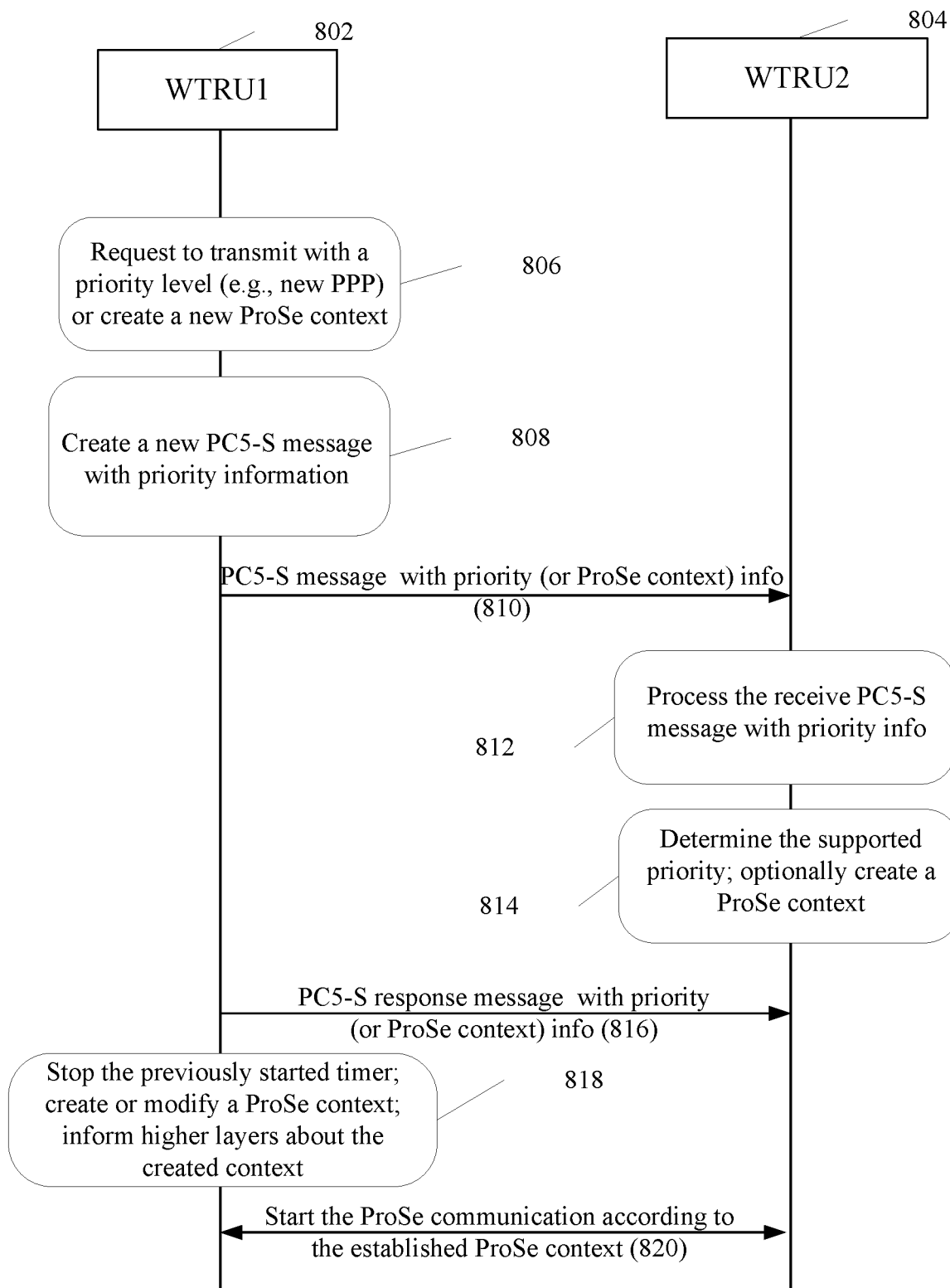
FIG. 8 illustrates an example of WTRU establishing a ProSe session with priority levels and/or ProSe context.

FIG. 8 illustrates an example of establishing a ProSe session with one or more priority levels or a ProSe context. As illustrated in FIG. 8, WTRU1 802 may have a priority level (e.g., a new PPP) associated with a packet to be transmitted. At 806, the application client may request the ProSe layer to create and/or transmit a message with a PPP (e.g., new PPP) or priority value. The application client associated with the WTRU1 802 may provide the priority level to a ProSe layer in WTRU1 802. The ProSe layer may verify whether a ProSe link or logical channel with the priority value exists. At 808, the ProSe layer of WTRU1 802 may create a PC5-S message (e.g., a new PC5-S message) that may have information about a new ProSe link or logical channel to be established and the associated priority. The ProSe layer may create the PC5-S message, for example, when a ProSe link or logical channel with the associated priority does not exist. The priority may be a mapped priority or a priority level received from the application layer. The ProSe layer may create a ProSe context to reflect the priority level requested by the application layer. At 810, the ProSe layer may send the PC5-S message to a destination WTRU, WTRU2 804. For example, the PC5-S message ma include information about the ProSe context or a priority level and a logical channel ID.

At 810, WTRU2 804 may receive the PC5-S message from WTRU1 802. At 812, WTRU2 804 may process and verify contents of the message including the priority information. For example, WTRU2 804 may verify whether an indicated priority level may be handled by the WTRU (e.g., mapped to an allowed EPS bearer associated with a QoS). At 814, WTRU2 804 may determine the supported priority value, and may create a ProSe context for a logical channel. WTRU2 804 may modify the supported priority level. At

816, WTRU2 804 may respond with a PC5-S message. The PC5-S message may indicate a supported priority level that can be handled.

At 816, WTRU1 802 may receive a PC5-S message from WTRU2 804. The PC5-S message may be received by WTRU1 802 in response to a previous message sent at 810, with contents indicating a supported priority level. At 818, WTRU1 802 may stop the timer previously started. WTRU1 802 may modify a corresponding ProSe context according to the indicated priority level and indicated logical channel. WTRU1 802 may inform the upper layers that a priority level has been granted. At 820, WTRU1 802 may engage with its peer WTRU, WTRU2 804 in ProSe communication, for example, according to the exchanged ProSe context.

The priority level information exchange between two WTRUs as described herein may be applicable to a case where a group of WTRUs are communicating via a ProSe layer. For example, a priority level for ProSe communication may be exchanged between two or more WTRUs, such as a group of WTRUs communicating using ProSe. A WTRU may send a PC5-S message to a group. A WTRU may indicate in message content that a priority indication or a request to modify a priority applies to the group. For example, a relay WTRU may seek to inform each of the remote WTRUs that it can no longer support the handling of a priority level or that it can support (e.g. only support) a maximum level of priority. The relay WTRU may send a PC5-S message, for example, to indicate a maximum priority level that can be supported and applied to each of the remote WTRUs. A PC5-S message from a relay WTRU may include information indicating message applicability to each of the remote WTRUs. A PC5-S message may include, for example, one or more of a Group ID, an IP address used by the group, a service ID, ProSe relay service code, or a destination L2 address used by the group. A PC5-S message may be sent to a group of remote WTRUs, for example, by using a destination L2 address used by a group. A WTRU may engage in a behavior (e.g., take the same actions) as discussed herein, for example, when a WTRU sends a PC5-S message to an individual peer WTRU.

A WTRU, that may be part of a group, may receive a PC5-S message. The PC5-S message may be addressed to the group of which the WTRU may be a part. The message may include a request to modify a ProSe context or priority used for communication with a source WTRU. The message may include a maximum level of priority that may be used by a receiving WTRU. The WTRU may modify its ProSe context accordingly or modify a priority used to communicate with a source WTRU accordingly. The WTRU may engage in behavior (e.g., take actions) as described herein when receiving a PC5-S message to modify a priority or ProSe context. A WTRU may respond to indicate the status of a request. A WTRU may inform higher layers about a change in priority level for communication.

The priority of a logical channel may be incorporated within a MAC header, e.g., along with LCID. A receiving peer WTRU may be able to extract the priority level associated with a (e.g. each) logical channel identified by LCID, for example, when the receiving peer WTRU is de-multiplexing different logical channels from a received MAC PDU. Priority information may be provided to the upper layers in a WTRU (e.g., ProSe and/or NAS layer(s)). Upper layers may use the priority information to determine that corresponding data from a logical channel is carried onto an EPS bearer. QoS profile of the EPS bearer may satisfy or meet the indicated priority of incoming ProSe data at relay WTRU.

Systems, methods, and instrumentalities may be provided to modify (e.g., dynamically modify) priority between WTRUs. For example, the priority may be modified when a WTRU is incapable of handling a priority level. For example, a relay WTRU context may include a mapping from a PC5 logical channel ID to an EPS bearer ID. This mapping may be based on the priority of the PC5 logical channel ID. The relay WTRU may have too much data to handle from one or more WTRUs, for example, at a certain priority level. The relay WTRU may have an EPS bearer deactivated, which may make the handling of PC5 traffic at a certain priority infeasible. The relay WTRU may send a PC5-S message to its peer WTRU, for example, to communicate the changes in its capability to handle traffic for a certain priority. The message may comprise a modified priority level that may be supported for at least one identified logical channel ID. The message may further comprise a cause code indicating a reason for a modification and/or a timer that specifies a duration for which the recipient may not be allowed to request another priority level or a higher priority level for the identified channel or one or more logical channel IDs. The relay WTRU may modify corresponding ProSe context before or after sending the PC5-S message. Modifying a ProSe context may involve changing parameter values (e.g., priority values) associated with a ProSe context or deactivating a ProSe context. Deactivating may result in deleting a ProSe context and the configuration used by the ProSe context. The relay WTRU may start a timer, for example, when sending the message. The timer may indicate a time (e.g. a maximum time) for a response. A WTRU may stop a timer, for example, when a response (e.g., a PC5-S response message) is received. The relay WTRU may send a request to modify a priority of a ProSe link, for example, when it can no longer act as a relay.

Figure 9:
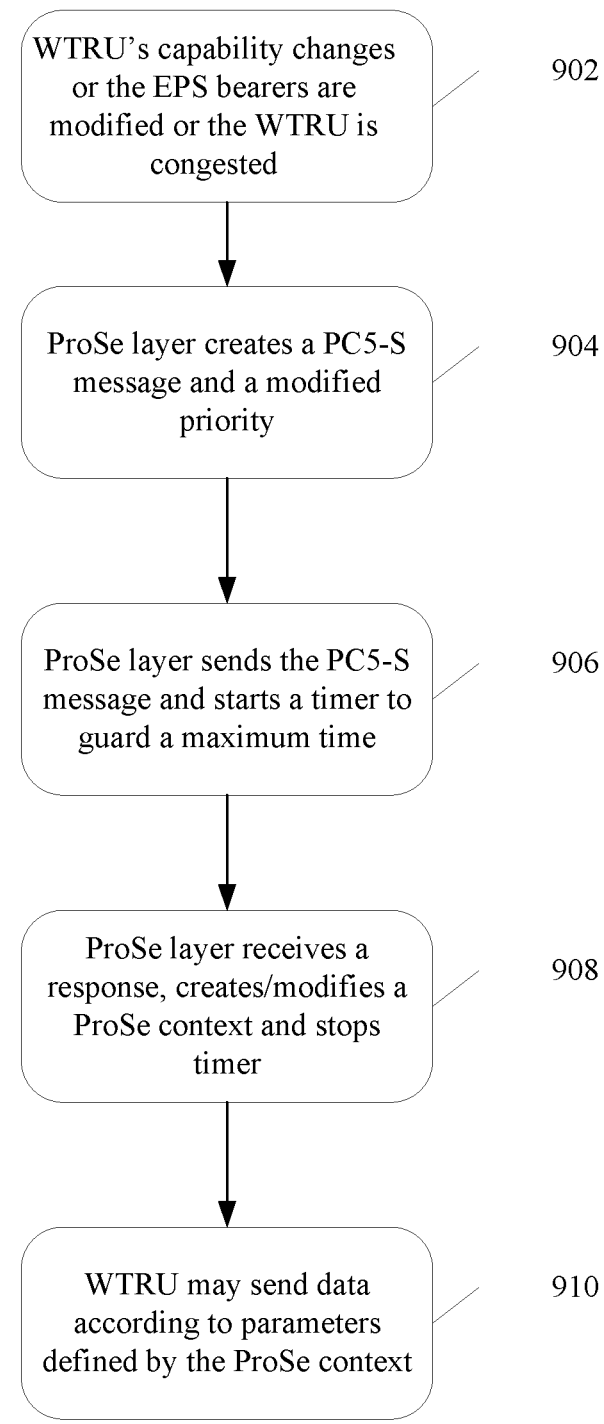
FIG. 9 illustrates an example of a WTRU (e.g., a relay WTRU) or ProSe layer sending a PC5-S message with modified priority information.

FIG. 9 illustrates an example of a WTRU (e.g. a relay WTRU) or ProSe layer in the WTRU sending a new PC5-S message with modified priority information. As illustrated in FIG. 9, at 902, one or more of the following may occur: a capability of a WTRU (e.g., a relay WTRU) may change, one or more EPS bearers may be modified, or the WTRU may be congested. At 904, a ProSe layer of the WTRU may create a PC5-S message (e.g., a new PC5-S message). The PC5-S message may include a modified priority level. The priority level may be modified for one or more of logical channel IDs. A priority level may be supported for each of the logical channel IDs. At 906, the ProSe layer may send the PC5-S message. The ProSe layer may start a timer. The timer may be run for a duration within which a response to the message sent may be received by the WTRU. At 908, the ProSe layer may receive a response. Accordingly, the ProSe layer may stop the timer and create and/or modify the ProSe context. The ProSe layer may inform one or more higher layers within the WTRU about such change. At 910, the WTRU may start handling data according to the parameters defined by the ProSe context. The ProSe context may be for one or more of a destination address, a logical channel ID, or an application ID. A PC5-S message may lead to modification of the Priority of a ProSe Link. Modification may occur, for example, when a WTRU (e.g., a relay WTRU) or ProSe layer cannot handle packets with a certain priority from one or more WTRUs.

A WTRU may receive a PC5-S message to modify the priority related to a ProSe link or a logical channel ID. A WTRU may modify its ProSe context according to a received modification request. In an example, a WTRU may delete a ProSe context and/or use a different priority level (or logical channel ID) for the packets allocated to this logical channel. The ProSe layer in the WTRU may inform the application layer that a certain priority level is no longer supported. The ProSe layer may provide a maximum priority level (e.g. PPP) that can be supported. An application client in a WTRU may start using priority levels within the supported range. The ProSe layer in a WTRU may respond with a PC5-S message, for example, to inform a peer WTRU that a ProSe context has been modified or that the priority level of a logical channel ID has been modified accordingly.

Figure 10:
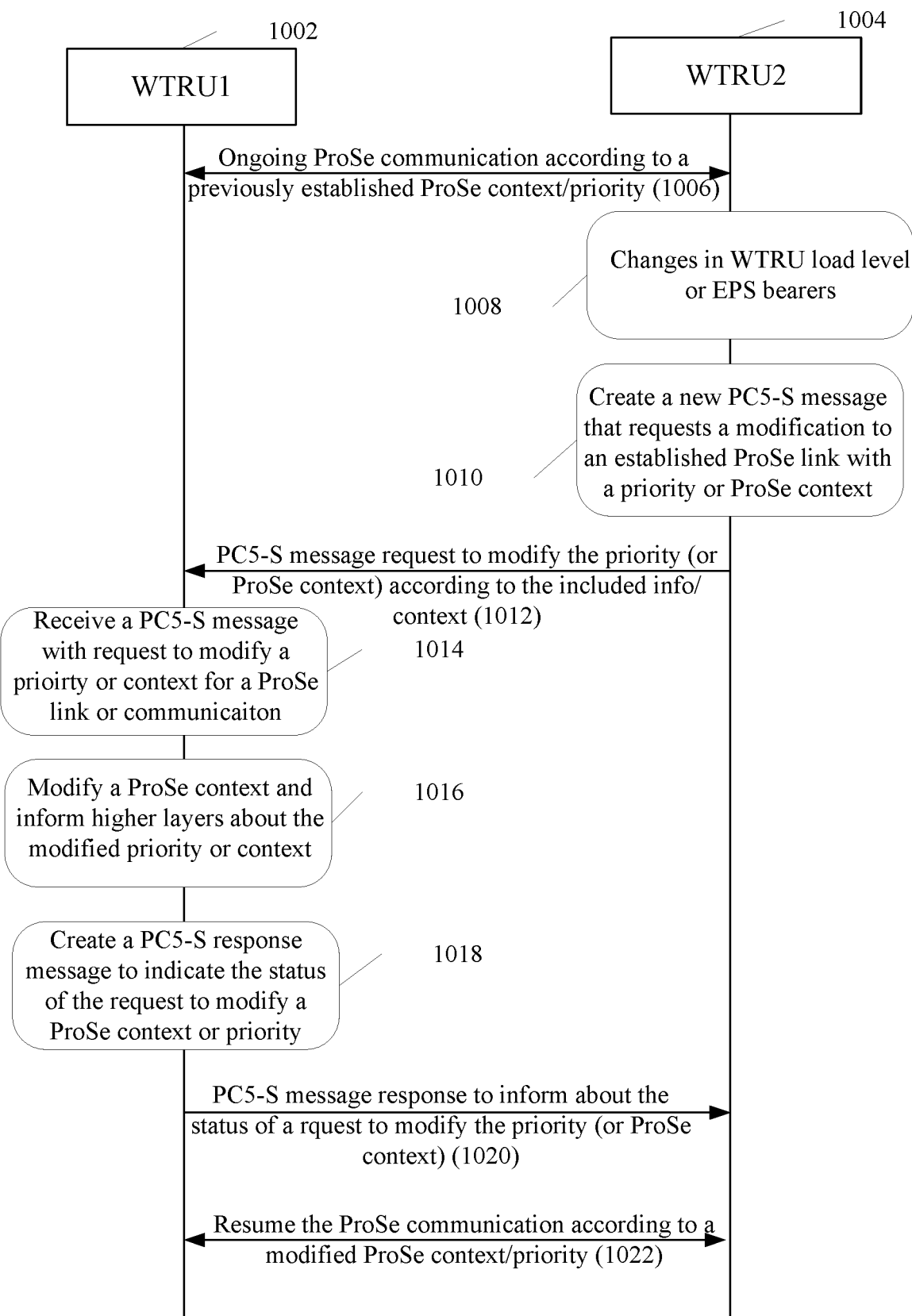
FIG. 10 illustrates an example of modifying a ProSe context or priority for a ProSe link or communication between two WTRUs, e.g., for one or more logical channel IDs.

FIG. 10 illustrates an example of modifying a ProSe context or priority for a ProSe Link or communication between two WTRUs, WTRU1 1002 and WTRU2 1004. The ProSe context or priority for a ProSe Link or communication may be for one or more logical channel IDs. As illustrated in FIG. 10, at 1006, a ProSe communication may be ongoing between WTRU1 1002 and WTRU2 1004. The ongoing ProSe communication may be based on a previously established ProSe context and/or priority. At 1008, changes may occur in one or more of the following: capability, load level, or EPS bearer of WTRU2 1004. For example, the EPS bearer may be modified or deactivated. At 1010, WTRU2 1004 may create a PC5-S message (e.g., a new PC5-S message) that may request a modification to an established ProSe link with a priority or a ProSe context. At 1012, WTRU2 1004 may send the PC5-S message requesting modification of the priority (or ProSe context) to WTRU1 1002. The message may include the information and or the ProSe context to be used for modification. At 1014, WTRU1 1002 may receive the message. At 1016, WTRU1 1002 may modify its ProSe context according to the received information and/or ProSe context. WTRU1 1002 may inform its higher layers about the modified priority and/or ProSe context. At 1018, WTRU1 1002 may create a PC5-S response message to indicate the status of the request to modify a ProSe context and/or a priority value. At 1020, WTRU1 1002 may send the response message to WTRU2 1004. The response message may inform WTRU2 1004 about the status of the request. At 1022, the ProSe communication between WTRU1 1002 and WTRU2 1004 may be resumed according to the modified ProSe context and/or priority value.

Systems, methods, and instrumentalities may be provided to determine a priority value of a ProSe link and mapping it to an EPS bearer. A priority level (e.g., as indicated in a PC5-S message with priority information or in a MAC header received by a relay WTRU) may be used as is or may be mapped to a PC5 ProSe priority level. A relay WTRU may determine an appropriate EPS bearer QoS to support a PC5 ProSe priority.

An EPS bearer QoS may be determined at a relay WTRU, for example, based on a mapping between PC5 ProSe priority and EPS QoS profile. For example, the EPS bearer QoS may be determined using parameters such as QCI, Allocation and Retention Priority (ARP), etc.

The EPS bearer QoS may be determined at a relay WTRU. For example, the EPS bearer QoS may be determined based on a clear mapping between PC5 ProSe priority and the Priority QoS attribute of the EPS bearer's QCI. A PC5 ProSe priority level may be mapped to one of the following: a priority of the non-Guaranteed Bit Rate (non-GBR) EPS bearers, such as EPS priorities 1, 7, 6, 8 and 9 with QCIs 5, 6, 7, 8 and 9, respectively, or to EPS priorities/QCIs (e.g. not only limited to non-GBR bearers). The PC5 ProSe priority level may be mapped, for example, when a guaranteed bit rate is not specified for a ProSe PC5 link/session (e.g., no QoS support for ProSe). ProSe PC5 priority to EPS priority/QCI mapping may be based on decision boundaries with specified ranges/thresholds, such that a particular range of PC5 priorities map to a given EPS priority value.

A ProSe may support QoS parameters including, for example, ProSe guaranteed bit rate, ProSe packet delay, ProSe packet loss, etc. These QoS parameters may be provided in a PC5-S message, for example, along with priority information. A PC5 priority level may be mapped to a priority of Guaranteed Bit Rate (GBR) EPS bearers, such as QCIs 1, 2, 3 and 4 with EPS priorities 2, 4, 5 and 3, respectively. QoS bearer characteristics may be selected to satisfy indicated PC5 QoS parameters.

Mappings from PC5 ProSe priorities to EPS QoS profiles or EPS QCIs/priorities may be static. These mappings may be based on a pre-determined relationship. The pre-determined relationship may be locally preconfigured at a relay WTRU, for example, in the mobile equipment (ME), universal subscriber identity module (USIM) ProSe configuration information or via ProSe management objects pushed to the WTRU via Open Mobile Alliance (OMA) Device Management (DM).

Mappings from PC5 ProSe priorities to EPS QoS profiles or EPS QCIs/priorities may be dynamic. For example, mappings from PC5 ProSe priorities to EPS QoS profiles or EPS QCIs/priorities may be assigned by a network. Such assignment may depend on the network's overall resources, WTRU's allowed and allocated bearer resources, etc. For example, a relay WTRU may contact a network node (e.g., an MME or a ProSe Function) to retrieve a mapping (e.g., upon reception of a PC5-S message with priority information). Mapping may be provisioned on a WTRU by a ProSe function, for example, during ProSe authorization.

A relay WTRU may determine the EPS QoS parameters (e.g., QCI) to satisfy the PC5 ProSe priority/QoS. A relay WTRU may check whether an EPS bearer with a QoS/QCI already exists or a new EPS bearer is to be established.

An established EPS bearer with a QoS/QCI may exist that may handle the PC5 ProSe priority. A relay WTRU may request update regarding uplink traffic flow templates (TFTs) for the active default or dedicated bearer with matching QoS. For example, the relay WTRU may request the update from a packet data network gateway (PGW). The relay WTRU may request the update to manage and/or steer ProSe traffic flows that may have similar QoS/QCI handling. A relay WTRU may initiate a WTRU requested bearer resource modification. The bearer resource modification may trigger bearer modification without a bearer QoS update.

A relay WTRU may choose to establish a new dedicated bearer with an appropriate QoS/QCI profile, for example, if no EPS bearer with an appropriate QoS/QCI is available. For example, the new dedicated bearer may be established by triggering WTRU requested bearer resource modification. Triggering of bearer resource modification may invoke a dedicated bearer activation for establishing a new dedicated bearer with an appropriate QoS/QCI based on required value.

As illustrated in FIG. 7, a relay WTRU may create a ProSe context, for example, when a ProSe priority is mapped to an EPS bearer, the EPS QoS/QCI are determined, and the EPS bearer is established or modified based on the determined EPS QoS/QCI parameters. The ProSe context may be created based on information about mapped EPS bearer on which packets may be forwarded, for example, mapping between a (logical channel ID, priority level) and an (EPS bearer ID, QoS parameters of the EPS bearer). The relay WTRU may send a response message to its peer WTRU to confirm the PC5 ProSe priority level that can be supported. A relay WTRU in downlink may engage in the foregoing behavior, for example, when it receives downlink data destined to a remote WTRU from eNB on a given EPS bearer. The relay WTRU may determine the associated PC5 logical channel to which an EPS bearer may map to. The relay WTRU may determine the associated PC5 logical channel, for example, when the EPS bearer ID of a bearer (e.g., with its corresponding QoS parameters), matches a mapped EPS bearer in a ProSe context that is maintained by the relay WTRU.

A relay WTRU may apply a reverse mapping of EPS QoS/QCI to PC5 ProSe priority to determine the appropriate PC5 logical channel, for example, if an EPS bearer ID does not exist in any of the relay WTRU's ProSe contexts or the same EPS bearer is mapped for one or more PC5 logical channels. For example, two different PC5 logical channels map to the same EPS bearer.

Reverse mapping may be statically or dynamically assigned as discussed herein. A relay WTRU may determine whether a new PC5 logical channel with determined PC5 priority should be established or whether an available PC5 logical channel exists and can be used. The relay WTRU may make such determination based on a determined PC5 ProSe Priority.

A relay WTRU may be configured with mapping information that maps an EPS bearer with a QoS to at least one PC5 ProSe priority level. Mapping information may comprise mapping from an EPS bearer with a QoS to a list (or range) of ProSe PC5 priorities. A WTRU may determine the PC5 priority level or range of priority levels that may be used, for example, when the WTRU receives data on an EPS bearer with a QoS. A WTRU may choose a highest or lowest priority based on its load conditions, for example, when there is a mapping to more than one levels.

An EPS QoS (e.g., Q1) may map to a range of values of PC5 ProSe priorities less than a value (e.g., a possible priority level P). Data may be received on an EPS bearer with a QoS. A WTRU may map data to a PC5 priority level P or below, for example, when the WTRU receives data on an EPS bearer with a QoS. The WTRU's mapping of the received data to a PC5 priority level P may depend on whether a logical channel with priority level P exists and/or the load conditions of the WTRU.

Figure 11:
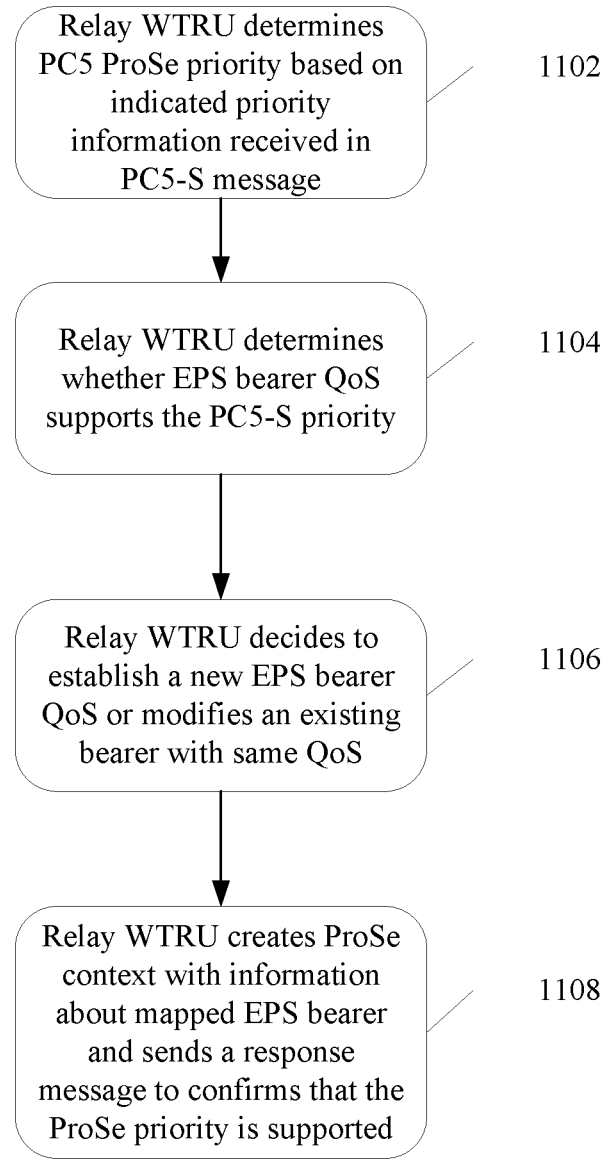
FIG. 11 illustrates an example of a relay WTRU or a ProSe layer receiving and/or processing a PC5-S message with priority information and determining appropriate evolved packet system (EPS) bearer mapping.

FIG. 11 illustrates an example of a relay WTRU or a ProSe layer receiving and/or processing a new PC5-S message with priority information and determining appropriate EPS bearer mapping. As illustrated in FIG. 11, at 1102, a relay WTRU may determine PC5 ProSe priority based on indicated priority information received in a PC5-S message. At 1104, the relay WTRU may determine whether bearer QoS (e.g., QCI) supports the PC5 ProSe priority. At 1106, the relay WTRU may decide to establish a new EPS bearer with determined EPS bearer QoS or modify an existing bearer with the same QoS. At 1108, the relay WTRU may create ProSe context with information about mapped EPS bearer and send a response message to confirm the ProSe priority to be supported.

A WTRU may map or use a lower priority or an EPS bearer with a lower QoS priority relative to the received priority, for example, if the WTRU cannot support the received priority or the mapped priority or may not support bearer modification or bearer activation. The WTRU may not be able to modify a bearer or activate a bearer, for example, due to a rejection from the network or existing pre-configuration. The WTRU may use a selected EPS bearer. The WTRU may modify the ProSe context. The modified ProSe context may include mapping between the ProSe link or logical channel and priority and selected EPS bearer. The WTRU may modify the ProSe context, for example, to reflect the selection and mapping as described herein.

The WTRU may respond to or inform other WTRUs about a modified priority level, for example, using a PC5-S signaling message. The PC5-S message may comprise a cause code to indicate a reason for modifying a priority.

Systems, methods, and instrumentalities for handling MBMS data at a WTRU-to-Network relay may be provided. An MBMS session priority level may be provided by a network. A relay WTRU that supports MBMS relaying may receive a service/session priority description/indication. The service/session priority description/indication may be received in an MBMS service announcement message from the service provider. For example, a priority description/indication may be associated with a TMGI in the user service description (USD) metadata.

A service provider may assign priorities for various MBMS services/sessions, for example, based on the nature of services/sessions. For example, a public safety related MBMS service may be assigned a higher priority over an entertainment service. A voice session may be assigned higher priority over a video session. The number of levels of MBMS service/session priorities and priority orders may be represented by a priority level number. For example, eight priority levels may be provided. For example, priority level 1 may be higher than priority level 2, and so on. A service announcement with missing priority information of an MBMS service/session may be considered as having lower priority than service announcements having explicit priorities.

Figure 12:
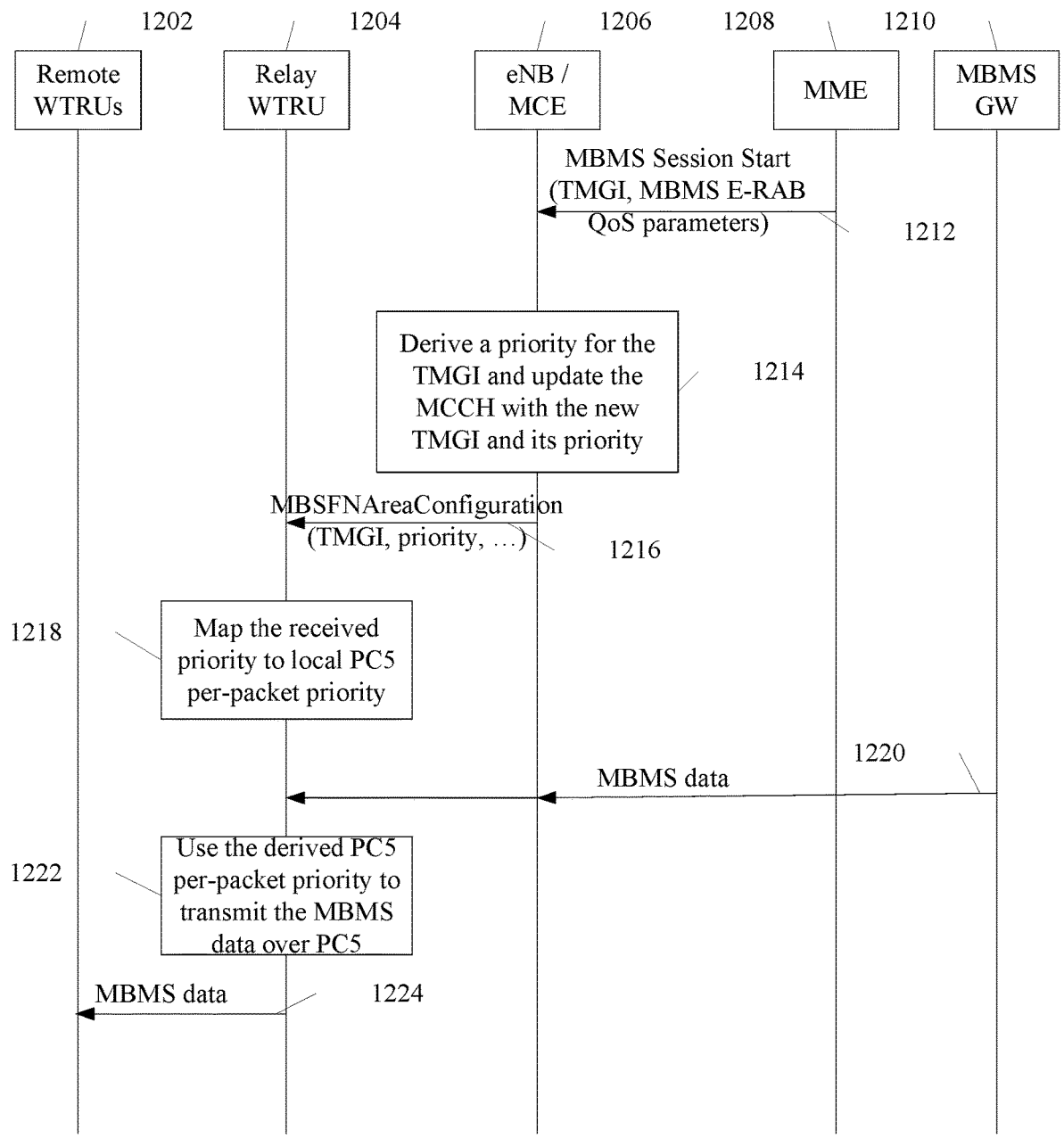
FIG. 12 illustrates an example of determining priority information of MBMS data.

FIG. 12 illustrates an example of determining priority of multimedia broadcast multicast services (MBMS) data. As illustrated in FIG. 12, at 1212, an evolved node B (eNB) or a multi-cell/multicast coordinating entity (MCE) 1206 may receive MBMS enhanced radio access bearer (E-RAB) QoS parameters from a mobility management entity (MME) 1208. At 1214, the eNB or MCE 1206 may determine/derive a priority for an MBMS session, for example, based on the MBMS E-RAB QoS parameters received from the MME. The parameters may be received over an M3 interface. An eNB or an MCE may derive (e.g., directly derive) a priority for an MBMS session from an Allocation and Retention Priority (ARP) in QoS parameters. MBMS-SessionInfo (e.g., as provided by an eNB) may comprise a priority level. An eNB may derive priority information, for example, using operations and maintenance (O&M) procedures. An eNB may receive priority information from an MME or an MBMS infrastructure in a network, such as an MBMS node in the network.

At 1216, relay WTRU 1204 may receive MBSFNArea-Configuration from eNB/MCE 1206. Relay WTRU 1204 that supports MBMS relaying may read a priority indication associated with a specific TMGI, for example, from the received MBSFNAreaConfiguration broadcast in a multicast control channel (MCCH). An MBMS-SessionInfo element of the MBSFNAreaConfiguration may be extended to provide a priority indication, for example, according to the following example:

---

MBMS-SessionInfo-r9 ::= SEQUENCE {
    tmgi-r9 TMGI-r9
    sessionId-r9 OCTET STRING (SIZE(1)) OPTIONAL, -- Need OR

```
logicalChannelIdentity-r9 INTEGER (0..maxSessionPerPMCH-1),
priority INTEGER (0..7)
...
}
```

At 1218, relay WTRU 1204 may use the received MBSFNAreaConfiguration to determine an appropriate PC5 priority level. The determined PC5 priority level may be mapped from a received (or read) priority level. Relay WTRU 1204 may be configured to perform mapping and/or to use a read or received priority level. Relay WTRU 1204 may create a ProSe context, for example, according to parameters or a sub-set of the parameters, e.g., parameters used to define or maintain ProSe communication context. Relay WTRU 1204 may verify its ProSe contexts, for example, when the WTRU receives data for an MBMS service (or TMGI). Verification may be performed, for example, to determine the PC5 logical channel, the WTRU may use for forwarding MBMS data on the PC5 link. A ProSe context may comprise information, such as a mapping between a TMGI and a ProSe link (or logical channel ID and/or other parameters). At 1212, relay WTRU 1204 may use the derived or determined PC5 per packet priority to transmit MBMS data over PC5 link. At 1220, the WTRU 1204 may receive MBMS, for example, from a MBMS gateway 1210. At 1224, relay WTRU 1204 may forward MBMS data to one or more remote WTRUs 1202. The relay WTRU 1204 may forward MBMS data on the determined ProSe link or with a determined priority level associated with a TMGI.

A relay WTRU that supports MBMS relaying may send a query message to an MME for QoS parameters of one or more MBMS sessions (e.g., TMGIs). An MME may return the QoS information it has assigned to one or more sessions. A Relay WTRU may derive a priority for the MBMS sessions, for example, based on received QoS parameters. A relay WTRU may query the ARP assigned to an MBMS session. A Relay WTRU may use received ARP information to derive a priority level.

A relay WTRU that supports MBMS relaying may send a query message to a ProSe function to query priority information for one or more MBMS service/sessions. The relay WTRU may send the query message via a PC3 interface. The query message may include an MBMS service description and identification, for example, to permit the ProSe Function to determine the application server that provides the service and identify the service in question. A ProSe function may determine the application server, e.g., based on the query message, and may forward the query to the server. The ProSe function may forward the query via a PC2 interface. A ProSe function may forward a response received from an application server to a relay WTRU that initiated the query.

An MBMS session priority level may be provided by a WTRU to other WTRUs. Other ProSe WTRUs, e.g., remote WTRUs, may proactively send the priority of MBMS service/sessions (e.g., as identified by a TMGI) that the remote WTRUs are interested in. The priority level information for a specific TMGI or other parameters that may be used to determine MBMS priority may be sent in a PC5-S (e.g., a new PC5-S) signaling message. For example, a TMGI monitoring request message may be used. Priority levels may be explicit or implicit. For example, a signaling message or a TMGI monitoring request message from a remote WTRU may include a priority level associated with a TMGI.

A priority may be implicitly derived. For example, the priority may be derived by a relay WTRU from the priority of a received PC5-S signaling message to setup a broadcast session. The signaling message may be a TMGI monitor request message. A relay WTRU may use the PPP, priority or LCID, for example, when it sends the eMBMS traffic on the PC5 one to many link. A remote WTRU may receive the information, for example, in the user services description (USD) or as part of application layer signaling. A WTRU may send a message, for example, upon a change of priority associated with a TMGI.

Figure 13:
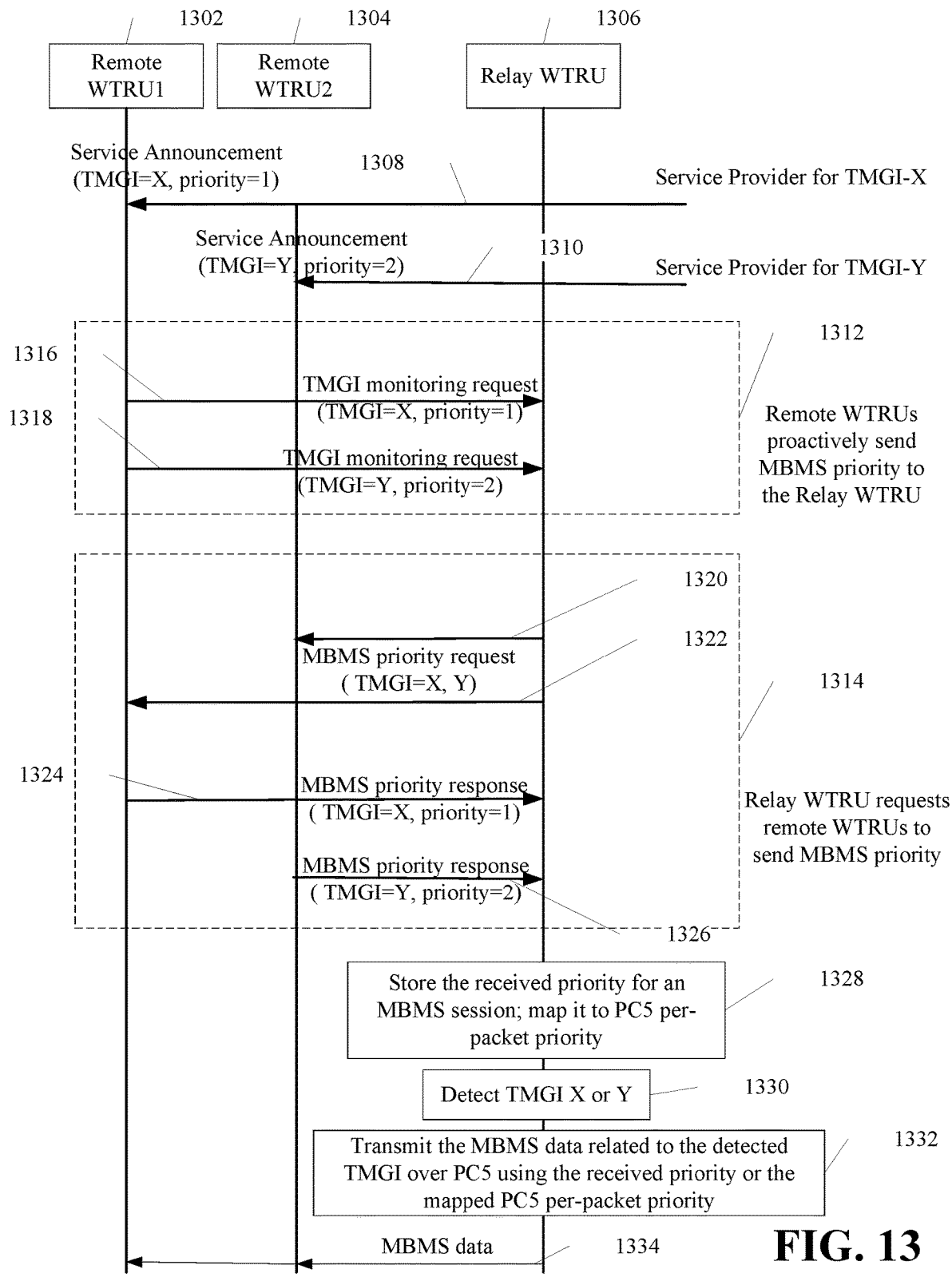
FIG. 13 illustrates an example of a relay WTRU receiving MBMS priority information or ProSe per packet priority information from a remote WTRU.

FIG. 13 illustrates an example of a relay WTRU receiving a ProSe per packet priority level information associated with a TMGI. As illustrated in FIG. 13, at 1308, remote WTRU1 1302 may receive a service announcement message. The remote WTRU1 1302 may receive the service announcement message from an application server. The service announcement message may include a priority level associated with a TMGI, e.g., TMGI X. At 1310, the remote WTRU2 1304 may receive a service announcement message. The service announcement message may include priority level information associated with another TMGI, e.g., TMGI Y. Each of the remote WTRUs may derive MBMS priority from the received priority level information associated with each of the TMGIs. At 1312, the remote WTRUs 1302 and/or 1304 may proactively send derived MBMS priority to the relay WTRU 1306. The MBMS priority may be the ProSe per packet priority level. At 1314, the relay WTRU 1306 may request remote WTRUs 1302 and/or 1304 to send MBMS priority.

As illustrated in FIG. 13, at 1316, remote WTRU1 1302, via a message (e.g. a PC5-S message), may send priority level information associated with TMGI X to the relay WTRU 1306. At 1318, remote WTRU2 1304, via a message (e.g. a PC5-S message), may send priority level information associated with TMGI Y to the relay WTRU 1306. The priority level information may be MBMS priority. The message used by the remote WTRU may be a PC5-S (e.g., a new PC5-S message) or a TMGI monitoring request message.

As illustrated in FIG. 13, at 1320 and 1322, relay WTRU 1306 may send a request messages to remote WTRUs remote WTRU1 1302 and remote WTRU2 1304, for example requesting a proper priority of the MBMS service/sessions as identified by a TMGI. The relay WTRU may send the request messages via a PC5 broadcast channel to one or more remote WTRUs. The relay WTRU may send the request messages via PC5-S messages to one or more remote WTRUs, for example the remote WTRUs that may have a one-to-one link established with the Relay WTRU.

Remote WTRUs WTRU1 1302 and WTRU2 1304, upon receiving a request from the relay WTRU 1306, may contact an application server or a ProSe function to obtain a priority level associated with a TMGI. As illustrated in FIG. 13, remote WTRUs WTRU1 1302 and WTRU2 1304 at 1324 and 1326 respectively may respond to a requests 1320 and 1322 with response messages. The response messages may be PC5-S messages (e.g., new PC5-S messages) or MBMS priority response messages. The response messages may indicate the priority of the MBMS service/sessions (as identified by the TMGI) to the relay WTRU.

At 1328, the relay WTRU 1306 may store the received MBMS priority values for MBMS sessions. The relay WTRU 1306 may map the priority levels to PC5 per packet priority values. At 1330, relay WTRU 1306 may detect MBMS data associated with TMGI X or TMGI Y. At 1332, relay WTRU 1306 may use the MBMS priority received from the remote WTRUs or the mapped PC5 per packet priority to transmit the MBMS data related to the detected TMGI to one or more remote WTRUs. A1334, the relay WTRU 1306 may send the MBMS data via a PC5 interface to one or more remote WTRUs.

A remote WTRU may send a new or existing PC5-S message to inform one or more other WTRUs about the received priority information indicating a priority level. The remote WTRU may send the PC5-S message upon receiving a new or modified priority information for MBMS service or data (e.g., as identified by a TMGI). The remote WTRU may proactively send the PC5-S message indicating the priority level information. A priority level may be a mapped priority level or a priority level received from an application layer or other network nodes. The network nodes may include an MME or a ProSe function.

A relay WTRU may broadcast an indication, e.g., together with a TMGI advertisement message. A remote WTRU that observes the indication may send the MBMS service/session priority information to the Relay WTRU, for example, as described herein.

A remote WTRU may determine the priority level associated with an MBMS service/session. For example, the priority may be determined based on pre-configured information. A WTRU may be configured with a priority level per TMGI. A remote WTRU may determine the proper priority for an MBMS service/session, for example, based on priority information in received service announcement messages. A WTRU (e.g., a remote WTRU) may determine a priority for a DL MBMS data priority, for example, based on a priority indication received from its application layer for the unicast UL data of the same service/group.

A relay WTRU may receive the priority information from a ProSe function or an MME. The relay WTRU may receive the priority information directly from the ProSe function or the MME. New messages or existing messages may be used to carry such information. A relay WTRU, for example, upon receiving the priority information, may create or modify a ProSe context. The ProSe context may be created, for example, so that a TMGI data or service may map to a PC5 ProSe link with a priority handling level.

A WTRU may determine a priority of an MBMS session/service. The WTRU may determine the priority information locally. A WTRU (e.g., a relay WTRU) that supports MBMS relaying may have a preconfigured list of MBMS services with an associated priority level assigned for handling on a PC5 ProSe link. The MBMS services may be identified by a TMGI. MBMS services may be identified, for example, by a globally unique service ID. A relay WTRU may look up the list to get the assigned priority. For example, the relay WTRU may look up the list on receiving a service announcement message with a service ID. A service ID that is not preconfigured in the WTRU may be considered lower priority than configured service IDs. A relay WTRU may obtain the priority information from an MME, ProSe function or an application server for which it may be relaying data. The relay WTRU may obtain this information directly from the MME or the ProSe function.

A WTRU, e.g., a relay WTRU may determine priority level of an MBMS session/service from an uplink unicast session data. MBMS data forwarded by a relay WTRU may be for public-safety applications, such as a group push-to-talk service. A remote WTRU that listens to the DL MBMS data forwarded by a relay WTRU may send uplink data to the application server. The DL MBMS data may be ProSe one to many communication. The application layer in a remote WTRU may provide PPP for uplink unicast data. A relay WTRU may receive uplink unicast data from the remote WTRU. The relay WTRU may establish mapping between one or more of the PPP, LCID, the priority, or the IP tuples of the related application, for example, as described herein. Such mapping information may be stored in the context of the remote WTRU. A relay WTRU may derive the PPP, LCID, priority, etc. from a previously established mapping, for example, when the relay WTRU subsequently receives the MBMS traffic from the same application server. The PPP, LCID, priority, etc. may be used, for example, to schedule the transmission on a PC5 interface.

In an example, a relay WTRU may receive, from a remote WTRU uplink, packets destined for an application server with a destination IP address and port. The relay WTRU may learn that the PPP, LCID, priority, etc. of the data. The relay WTRU may establish a mapping between Dest_IP_Addr/Port—PPP, LCID, priority, etc. The relay WTRU may receive MBMS data that has the source IP address and port that are identical to the stored Dest_IP_Addr/Port. The relay WTRU may use the learned PPP to forward the MBMS data to one or more remote WTRUs. For example, the relay WTRU may forward the MBMS data over a PC5 link.

A relay WTRU may send the same or similar traffic in the downlink on a one to one communication PC5 interface, for example, before relaying MBMS traffic. A relay WTRU may store the last PPP, priority value or LCID used to send the traffic to the remote WTRU. The last stored unicast PPP, priority or LCID may be used to transmit MBMS broadcast traffic, for example, when the relay WTRU starts transmitting the MBMS traffic on a PC5 one to many link.

An MBMS service/session priority may be mapped to a PC5 transmission priority. A relay WTRU may receive service/session priorities related to MBMS data it may relay from the network or remote WTRUs. A Relay WTRU may be pre-configured with a mapping (e.g., a fixed mapping) between service/session priorities and PC5 per packet priorities. The relay WTRU may map the MBMS service/session priorities to one or more PC5 per packet priorities. Mapping may or may not be one-to-one mapping. A number of priority levels may be different. Multiple service/session priorities may be mapped to a (e.g. the same) PC5 per packet priority.

Systems, methods and instrumentalities to determine priority handling for PC5-S traffic may be provided. Techniques to determine a priority associated with a PC5-S message may be provided. PC5-S signaling may be initiated by a ProSe layer of a remote WTRU. For example, the signaling may be initiated upon receiving a trigger from an application layer in the WTRU. An upper layer application may trigger a ProSe layer to initiate one to one direct communication, for example, by passing to the ProSe layer a destination ID, e.g., a Layer-2 Destination ID, or a higher layer destination ID of a peer WTRU. A trigger message, e.g., provided by an application layer, may comprise a priority level information associated with the trigger message to the ProSe layer in the WTRU. A ProSe layer may determine the priority of each PC5 signaling message, for example, based on the priority level information or priority. A determined priority may be a PPP or a mapped priority level, for example, mapped from a PPP. The priority provided by an application layer may be a PPP or any other priority associated with the request.

A priority may be indicated to a ProSe layer by one or more ways as described herein. A priority may be indicated to a ProSe layer, for example, by indicating a level (e.g., from 1 to x) to a ProSe layer. In an example, 1 may be a highest priority application and x may be a lowest priority application.

A priority may be indicated to a ProSe layer, for example, by indicating an explicit application/request type to the ProSe layer in the WTRU, e.g., emergency, public safety, non-public safety, police application, etc.

A priority may be indicated to a ProSe layer, for example, by providing an application ID in a trigger message. The ProSe layer may be able to derive a priority from an application ID received from an application layer. Mapping between an application ID and a determined priority (e.g., for transmission of a PC5-S message) may be pre-configured in the WTRU, obtained from the ProSe Function or obtained from the application server.

A priority level of PC5-S messages may be determined by the ProSe layer, for example, based on a priority received from an application layer. A ProSe layer may pass the priority of the PC5-S message to the access stratum or lower layers, e.g., as illustrated in FIG. 14.

Figure 14:
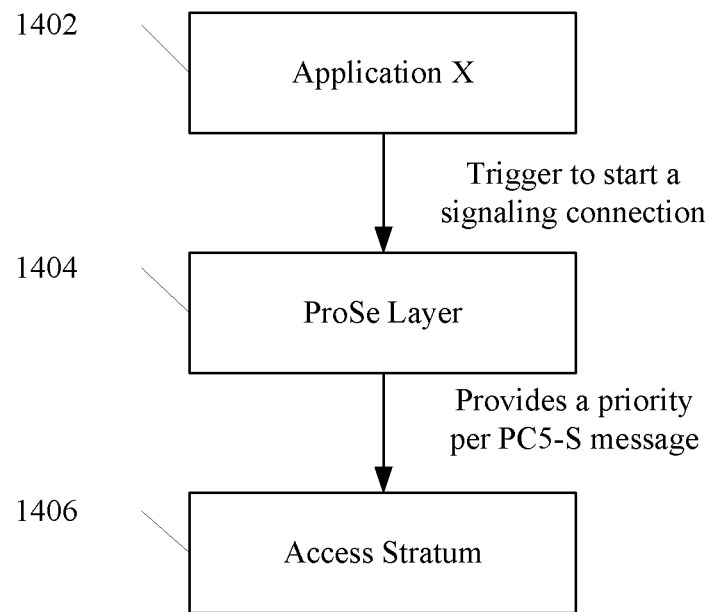
FIG. 14 illustrates an example of handling priority for a PC5 signaling (PC5-S) message.

FIG. 14 is an example of handling priority for a PC5-S message. As illustrated in FIG. 14, a ProSe layer 1404 may pass a PC5-S packet from an application layer 1402 to the access stratum 1406. A separate logical channel may be created and the ProSe context may be updated in the ProSe layer at the access stratum for sending signaling packets, for example, when a logical channel with the same priority does not already exist. PC5-S and PC5-U (e.g., signaling and data) packets may be sent on a logical channel. The packets may be sent on the same logical channel when they have the same priority level.

A ProSe layer may employ a fixed mapping between a priority level received from an application and a priority level (e.g., a PPP or a mapped priority) of the PC5-S message. PC5 messages originating due to a trigger from a particular application (e.g., as determined by an application ID or application type) may have the same determined priority value. For example, an application may indicate emergency or other highest priority level to the ProSe layer. An indicated level may be mapped to a PC5-S priority level 1 at the ProSe layer. For example, the indicated level may be mapped based on the mapping information in the WTRU (e.g., locally in the WTRU). A priority may be determined for the application and may be used for subsequent PC5 messages. As an example, subsequent PC5 messages that may be triggered by the application e.g. by (ID or type), such as a direct communication request, security parameter exchange message, keep alive, etc., may be transmitted with the same priority level, e.g. level 1 in this example.

Each of PC5-S message types may have a priority level (e.g., a different priority level) associated with it. The associated priority levels may be configured in the ProSe layer. As an example, a direct communication request message may be configured to have a priority level. A PC5-S message may have a higher priority than another PC5-S message type, such as a link keep alive message or other PC5-S message type. A ProSe layer may have a pre-configured determined priority for another PC5-S message, such as a TMGI monitoring request message. A ProSe layer or the WTRU may have a list of PC5-S messages with an ordered priority level. As an example, a first entry in a list may be considered to have a highest priority or may have an explicit priority number. A lowest entry in the list may be considered to have a lowest priority or may have an explicit priority number.

Priority of a PC5-S message may be determined, for example, using a combination of techniques. As an example, a priority of a PC5-S message may be determined using a type of (PC5-S) message requested to be sent and the Application ID/type that triggers the request.

Figure 15:
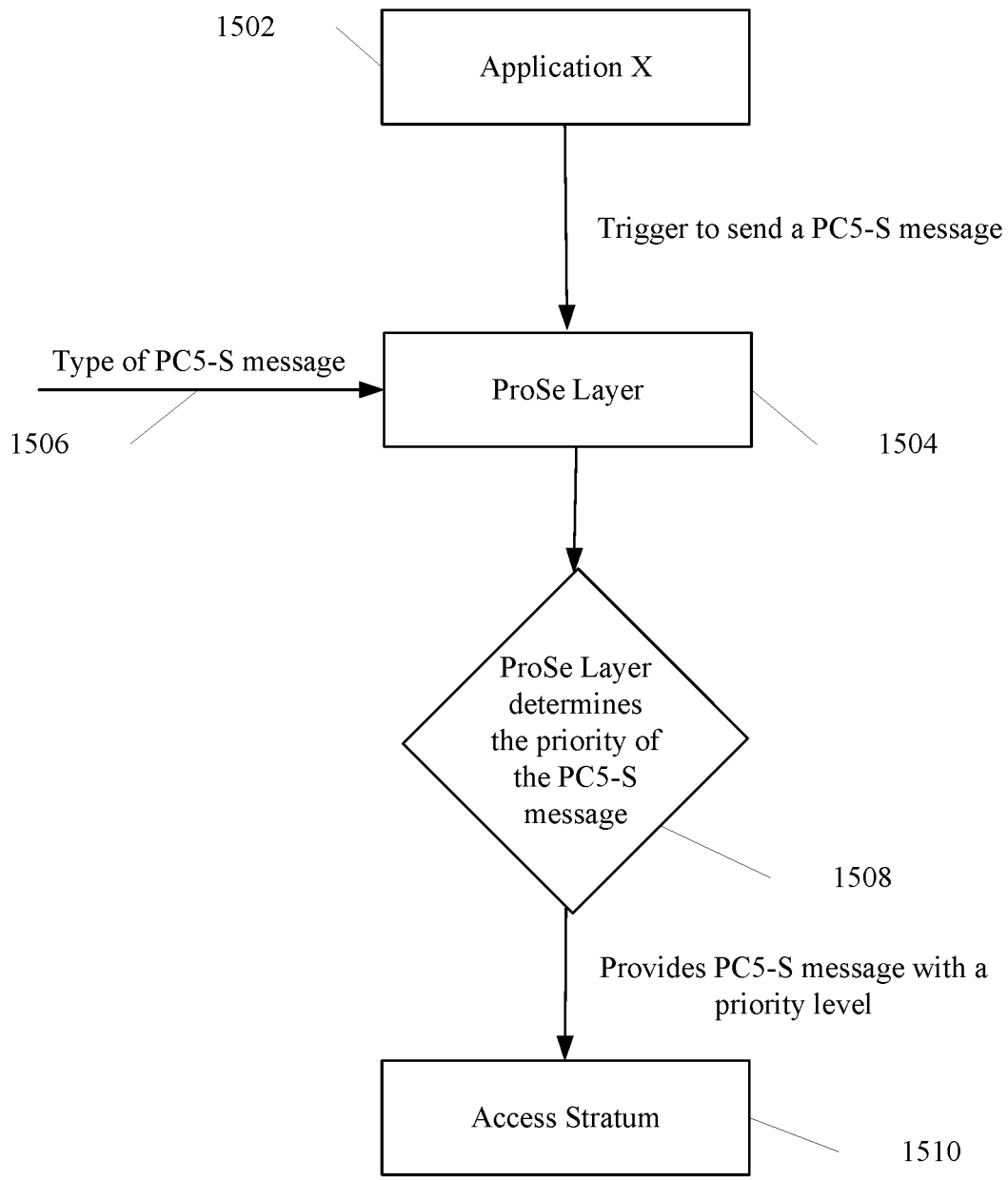
FIG. 15 illustrates an example of determining a priority level for transmitting a PC5-S message.

FIG. 15 illustrates an example of determining a priority level for transmitting a PC5-S message. As illustrated in FIG. 15, one or more inputs may be used to determine a priority level of a PC5-S message. As illustrated in FIG. 15, an application X 1502 may send a trigger PC5-S to the ProSe layer 1504. The trigger message may include a priority of application ID of the PC5-S message type. ProSe layer 1504 may receive a type of PC5-S message 1506 from a peer WTRU. At 1508, the ProSe layer 1504 may determine priority of the PC5-S message according to one or more factors and/or inputs. The ProSe layer 1504 may verify whether a logical channel with a determined priority exists for a destination WTRU. The ProSe layer 1504 may request that lower layers (e.g., the access stratum 1510) create a logical channel with a determined priority, for example, when a logical channel with a determined priority does not exist. At 1510, the ProSe layer 1504 may provide the lower layers the PC5-S message with the determined priority level.

A WTRU may obtain mapping information from a ProSe Function or from a network node, e.g., MME. One or more messages may be defined on an interface used to obtain the information, such as an interface between a WTRU and ProSe function (e.g., a PC3 interface) or between a WTRU and an MME (e.g., using NAS protocol). A WTRU may request an MME or a ProSe function for mapping or priority information, for example, when a new PC5-S message is received for which the WTRU does not have information to determine the priority level.

Priority information for a PC5-S message may be determined, for example, by preconfiguring the priority levels for different PC5-S messages. For example, the priority may be preconfigured in a universal subscriber identity module (USIM) ProSe configuration information. The priority information may be obtained via ProSe management objects pushed to the WTRU, for example, via open mobile alliance (OMA) device management (DM).

Information may be provided by the ProSe function on a per public land mobile network (PLMN) basis. One or more PLMNs may configure WTRUs with different priority levels/PPP levels for each PC5-S message. A ProSe layer may pass on a corresponding preconfigured priority level for a message to the access stratum layer in the WTRU, for example, when the ProSe layer generates a PC5-S message.

Figure 16:
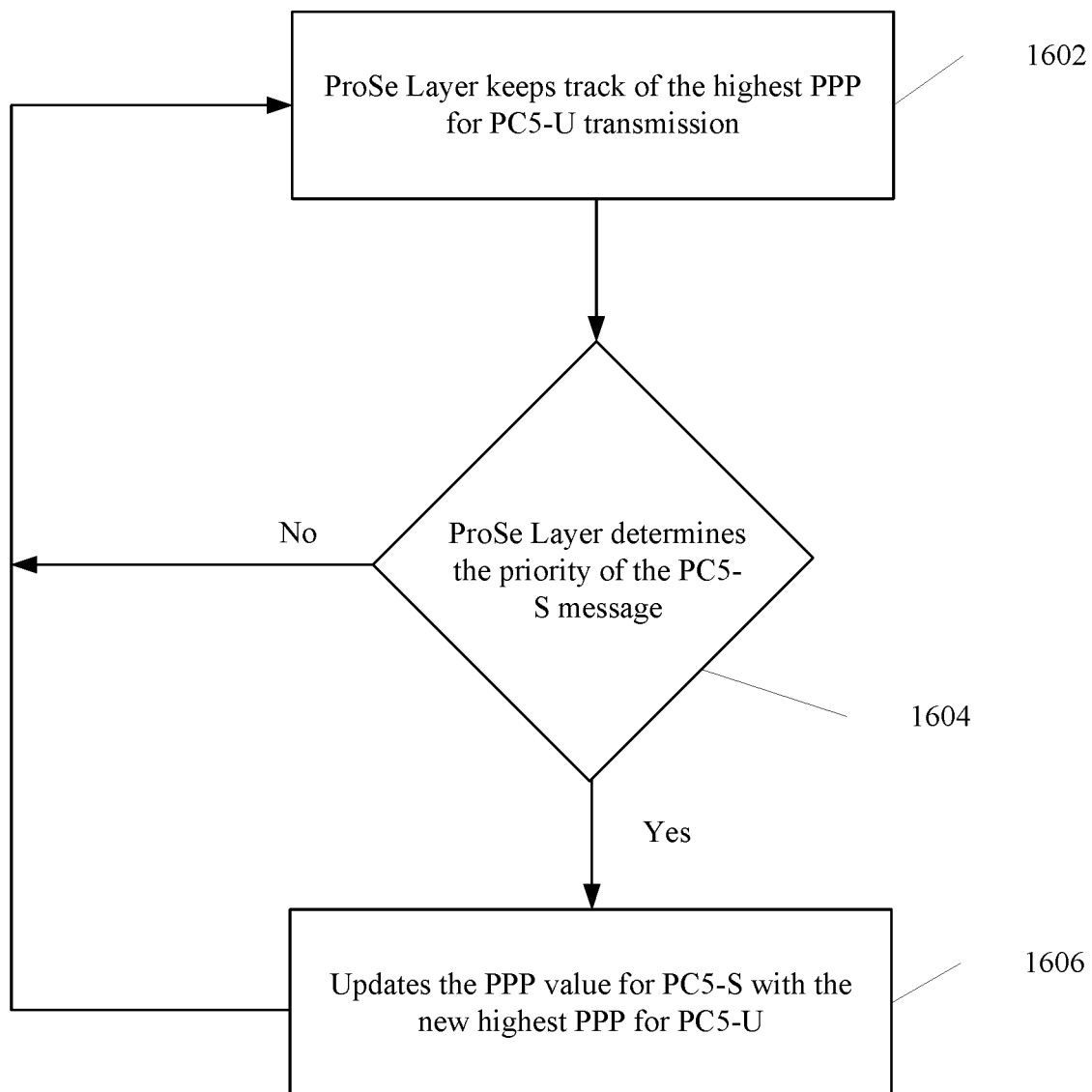
FIG. 16 illustrates an example of updating a PPP value of PC5-S messages based on a highest PPP (e.g., a new highest PPP) of a PC5-U transmission.

FIG. 16 illustrates an example of updating a PPP value of PC5-S messages based on a new highest PPP of a PC5-U transmission. As illustrated in FIG. 16, at 1602 the ProSe layer may keep track of the highest PPP for a PC5-U transmission. At 1604, the ProSe layer may determine the priority of the PC5-S message. For example, the priority of the PC5-S message may be determined according to one or more factors/inputs. At 1606, the ProSe layer updates the PPP value for a PC5-S message with the highest PPP for PC5-U message. The priority of a PC5 message may be determined based on the highest PPP value used by a WTRU for PC5-U transmission. The highest PPP value of PC5-U transmission may be used, in a number of ways, to determine the PPP or priority of PC5-S messages. Several examples of using the highest PPP value of PC5-U transmission to make a PC5-S priority determination are described herein.

A protocol layer, for example, a ProSe Protocol layer, a non-access stratum (NAS) layer, or a radio resource control (RRC) layer may keep track of the highest PPP value used for PC5-U transmission. The highest PPP value for user plane transmission (e.g., a PC5-U transmission) may be tracked and used as the PPP value for each of the PC5-S messages. For example, a WTRU may transmit user plane packets with priorities from PPP-2 to PPP 7, where PPP-2 is the highest priority in this example. In an example, PC5-S messages may use the highest available PPP (e.g. PPP-2) for PC5-S messages. A priority range for user plane packets may change to PPP 1 to PPP 7, where PPP 1 is the new highest user plane priority value. In an example, PC5-S messages may be sent with the new available highest user plane PPP value (e.g. PPP-1), as illustrated in FIG. 16.

A ProSe layer may use a range of possible PPP values for different PC5-S messages based on the highest used PPP value used for PC5-U transmission. For example, the highest used PC5-S transmission may be PPP x. In an example, a range of PPP values for PC5-S messages may be PPP x+y, where y may be a positive or negative integer. For example, y may be 2, 3, and 4 and so on. The value of y may be preconfigured in a WTRU, signaled by the ProSe function as part of configuration information, or provided by an App server over a PC1 interface. For example, a highest PPP value used on the PC5-U link may be PPP-3. The value of y may be 3. The PPP value for various PC5-S messages may be selected from a range of PPP 3 to PPP 6, for example, based on previously described algorithms or procedures. In an example of using the range, a direct communication request message may be sent with PPP 3 whereas a link maintenance message may be sent with PPP 6. The range of PPP for PC5-S messages may change, for example, when the highest used PPP for PC5-U transmission changes. The range of PC5-S messages may change from PPP3-PPP6 to PPP2-PPP5, for example, when a packet is transmitted with PPP 2 value.

The WTRU may be configured to use one value or a range of values for x and/or y, for example based on a received configuration. The WTRU may receive the configuration from the ProSe function or via other methods such as an OMA configuration, a USIM configuration, etc. A WTRU may forward the configuration to another WTRU for use when transmitting a PC5-S message. For example, a remote WTRU may send a new PC5-S message to a relay WTRU in order to inform the relay the value (fixed or a range) to use for PC5-S messages.

Systems, methods, and instrumentalities may be provided to determine a priority for PC5-S retransmissions. A ProSe layer may be configured to retransmit PC5-S messages, for example, when it does not receive a response from the intended recipient. A ProSe layer in the transmitting WTRU may send a message X times, e.g., for every signaling message before it may determine that the destination WTRU is unavailable.

A ProSe layer may modify (e.g., increase) a priority or the PPP value of the message being retransmitted, for example, when a PC5-S message is retransmitted. A ProSe layer may determine how to modify the priority value of the retransmitted message, such as whether a priority is increased for every retransmission or every second retransmission, etc. A ProSe layer may reset a priority to a previous or original value, for example, when the ProSe layer receives a response from a recipient WTRU. The subsequent PC5-S messages sent by the ProSe layer to the same destination may be sent with an earlier or original PPP or priority value.

A logical channel may be created at the AS for a retransmission message with a higher priority or new PPP level, for example, when it does not already exist. The context in the ProSe layer may be updated. A signaling logical channel may be used, for example, to send the message with a new priority level. The AS layer may use an existing logical channel with the same priority for data packets to send the PC5-S message with the new priority level.

Systems, methods and instrumentalities may be provided to obtain IP address information or other relay WTRU identification. A WTRU (or a ProSe layer in the WTRU) may send a PC5-S message to request an IP address or the prefix of the relay WTRU, e.g., as assigned by the relay WTRU's PDN Gateway (PGW). The PC5-S message may be a new PC5-S message. A request may be made from the application layer, for example, when the WTRU detects that it has lost network coverage and/or has discovered a WTRU-to-Network relay. A WTRU may start a timer to guard a period in which a response is expected, e.g., while a retransmission may be made. A message provided by a WTRU may comprise an identity, e.g., so that a request may be authorized by its peer WTRU. A WTRU may receive a message (e.g., a response) with information about an IP address used by another WTRU. A ProSe layer in the WTRU may forward information (e.g., about the IP address) to the application client. An application client may send information to an application server. A ProSe layer in the WTRU may be configured, for example, to send received information to another entity in the network, such as a ProSe function or an application server.

A WTRU (e.g., a relay WTRU) may receive a request to provide its IP address or prefix, e.g., as assigned by the PGW. A WTRU may verify whether a requesting WTRU is authorized to make a request or receive requested information, for example, by contacting the ProSe function or the MME and providing an identity of the source WTRU. A relay WTRU may send a new message to the ProSe Function or a new NAS message to the MME and may verify a response from these nodes. A WTRU may respond, e.g., to an authorized requesting WTRU, with a new PC5-S message that may comprise its IP address or prefix assigned by the network.

Systems, methods, and instrumentalities may be provided for priority handling of ProSe communications. A WTRU may create a Proximity Services (ProSe) context and may send a new PC5-S message to its peer WTRU (e.g., relay WTRU), for example, to indicate the priority of an associated logical channel ID. A WTRU may create a ProSe context and may send a new PC5-S message to its peer WTRU (e.g., relay WTRU), for example, for one or more new priority (ies) with which a transmission (Tx) may be made. A WTRU may receive a PC5-S message with a priority level for a ProSe communication. A WTRU may determine a priority to use and may map the priority to a corresponding EPS bearer, which may modified or created. The WTRU may respond and may indicate a priority level that can be supported. A remote WTRU may obtain from an Access Stratum (AS) a priority level for downlink (DL) forwarding (e.g., for Multimedia Broadcast Multicast Services (MBMS) data) at a relay WTRU. A remote WTRU may send a PC5-S message (e.g., a new PC5-S message) to a relay WTRU. The remote WTRU via the PC5-S message may indicate the priority level to be used on the PC5 link. A relay WTRU may forward MBMS traffic to one or more remote WTRUs. A relay WTRU may read a priority level of temporary mobile group identity (TMGI) data from System Information Blocks (SIBs). A relay WTRU may set a PC5 logical channel priority, for example, according to TMGI data read from SIBs. A relay WTRU may send a new PC5-S message to a remote WTRU, for example, to request a priority level of a TMGI. A relay WTRU may use a received PC5-S message from a remote WTRU, for example, to determine a priority level to be used on a PC5 link on which MBMS data is forwarded. A WTRU may determine a priority level for a PC5-S message, for example, based on pre-configurations per message type, application ID and/or or a default value. A WTRU may transmit a PC5-S message with a determined priority level. A PC5-S procedure may be used, for example, by a first WTRU to request from a second WTRU an IP address and/or prefix that may be used by a target WTRU for Evolved Packet System (EPS) bearers and/or Packet Data Network (PDN) connections. An IP address and/or prefix may be forwarded by the first WTRU to the AS, for example, to help with session continuity. The highest used point to point protocol (PPP) value for user plane transmission (e.g. PC5-U transmission) may be used as the PPP value for each of the PC5-S messages.

The processes and instrumentalities described herein may apply in any combination, may apply to other wireless technologies, and for other services. A WTRU may refer to an identity of the physical device, or to the user's identity such as subscription related identities, e.g., MSISDN, SIP URI, IP address, etc. WTRU may refer to application-based identities, e.g., user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed is:

1. A first wireless transmit/receive unit (WTRU) comprising:
    a processor configured to at least:
        establish a first ProSe link with a second WTRU over a PC5 interface, wherein the first ProSe link is associated with a first ProSe context, and wherein the first ProSe context is associated with a first Application ID;
        determine that a data transmission is initiated by an application layer of the first WTRU, wherein the data transmission is to be transmitted via the PC5 interface, and wherein the data transmission is associated with a second Application ID;
        determine, by comparing at least the first Application ID of the first ProSe context with the second Application ID, whether the established first ProSe link associated with the first ProSe context is configured to be used by the first WTRU to send the data transmission to the second WTRU over the PC5 interface; and
        send the data transmission to the second WTRU over the PC5 interface, wherein, on a condition that the established first ProSe link associated with the first ProSe context is not configured to be used by the first WTRU to send the data transmission of the data to the second WTRU, being configured to send the data transmission comprises being configured to:
            establish a second ProSe link with the second WTRU over the PC5 interface, wherein the second ProSe link is associated with a second ProSe context, and wherein the second ProSe context is associated with the second Application ID, and
            send the data transmission to the second WTRU over the PC5 interface using the established second ProSe link.

2. The first WTRU of claim 1, wherein being configured to establish the second ProSe link comprises being configured to send a request message to the second WTRU comprising an indication of a PC5 priority level associated with the second ProSe link.

3. The first WTRU of claim 2, wherein being configured to establish the second ProSe link comprises being configured to receive a response from the second WTRU indicating an accepted PC5 priority level.

4. The first WTRU of claim 3, wherein the PC5 priority level associated with the second ProSe link is a same PC5 priority level as the accepted PC5 priority level.

5. The first WTRU of claim 1, wherein on a condition that the first ProSe link associated with the first ProSe context is configured to be used by the first WTRU to send the data transmission to the second WTRU over the PC5 interface, the processor is further configured to send the data transmission to the second WTRU over the PC5 interface using the first ProSe link.

6. The first WTRU of claim 1, wherein the first ProSe context or the second ProSe context comprises at least one of a layer 2 (L2) source address, an L2 destination address, an internet protocol (IP) layer attribute, or a priority level associated with the first ProSe link or the second ProSe link.

7. The first WTRU of claim 1, wherein the data transmission is associated with an application.

8. A method implemented by a first wireless transmit/receive unit (WTRU), the method comprising:
    establishing a first ProSe link with a second WTRU over a PC5 interface, wherein the first ProSe link is associated with a first ProSe context, and wherein the first ProSe context is associated with a first Application ID;
    determining that a data transmission is initiated by an application layer of the first WTRU, wherein the data transmission is to be transmitted via the PC5 interface, and wherein the data transmission is associated with a second Application ID;
    determining, by comparing at least the first Application ID of the first ProSe context with the second Application ID, whether the established first ProSe link associated with the first ProSe context is configured to be used by the first WTRU to send the data transmission to the second WTRU over the PC5 interface; and
    sending the data transmission to the second WTRU over the PC5 interface, wherein, on a condition that the established first ProSe link associated with the first ProSe context is not configured to be used by the first WTRU to send the data transmission to the second WTRU, sending the data transmission comprises:
        establishing a second ProSe link with the second WTRU over the PC5 interface, wherein the second ProSe link is associated with a second ProSe context, and wherein the second ProSe context is associated with the second Application ID, and
        sending the data transmission to the second WTRU over the PC5 interface using the established second ProSe link.

9. The method of claim 8, wherein establishing the second ProSe link comprises sending a request message to the second WTRU comprising an indication of a PC5 priority level associated with the second ProSe link.

10. The method of claim 9, wherein establishing the second ProSe link comprises being configured to receive a response from the second WTRU indicating an accepted PC5 priority level.

11. The method of claim 10, wherein the PC5 priority level associated with the second ProSe link is a same PC5 priority level as the accepted PC5 priority level.

12. The method of claim 8, wherein on a condition that the first ProSe link associated with the first ProSe context is configured to be used by the first WTRU to send the data transmission to the second WTRU over the PC5 interface, sending the data transmission to the second WTRU over the PC5 interface using the first ProSe link.

13. The method of claim 8, wherein the first ProSe context or the second ProSe context comprises at least one of a layer 2 (L2) source address, an L2 destination address, an internet protocol (IP) layer attribute, or a priority level associated with the first ProSe link or the second ProSe link.

14. The method of claim 8, wherein the data transmission is associated with an application.

15. A first wireless transmit/receive unit (WTRU) comprising:
    a processor configured to at least:
        establish a first ProSe link with a second WTRU over a PC5 interface, wherein the first ProSe link is associated with a first ProSe context, and wherein the first ProSe context is associated with a first Application ID;
        determine that a data transmission is initiated by application layer of the first WTRU, wherein the data transmission is to be transmitted via the PC5 interface, and wherein the data transmission is associated with a second Application ID;
        determine, by comparing at least the first Application ID of the first ProSe context with the second Application ID, whether the established first ProSe link associated with the first ProSe context is configured to be used by the first WTRU to send the data transmission to the second WTRU over the PC5 interface; and
        send the data transmission to the second WTRU over the PC5 interface, wherein on a condition that the established first ProSe link associated with the first ProSe context is not configured to be used by the first WTRU to send the data transmission to the second WTRU, being configured to send the data transmission comprises being configured to:
        send a request message to the second WTRU to establish a second ProSe link over the PC5 interface, wherein the second ProSe link is associated with a second ProSe context, wherein the request message comprises an indication of a PC5 priority level associated with the second ProSe link, and
        receive a response from the second WTRU indicating an accepted PC5 priority level, and
        send the data transmission to the second WTRU over the PC5 interface using the established second ProSe link and the accepted PC5 priority level.

* * * * *

UNITED STATES PATENT AND TRADEMARK OFFICE
CERTIFICATE OF CORRECTION

PATENT NO. : 11,558,724 B2
APPLICATION NO. : 17/007300
DATED : January 17, 2023
INVENTOR(S) : Mahmoud Watfa et al.

It is certified that error appears in the above-identified patent and that said Letters Patent is hereby corrected as shown below:

In the Specification

Column 8, Line 56: Delete "Si" and insert -- S1 --

Column 8, Line 66: Delete "Si" and insert -- S1 --

Column 19, Line 28: Delete "and or" and insert -- and/or --

Column 22, Line 65: Delete "TMGI-r9" and insert -- TMGI-r9, --

Column 25, Line 3: Delete "A1334," and insert -- At 1334, --

Column 28, Lines 40-46: Delete "Information may be provided by the ProSe function on a per public land mobile network (PLMN) basis. One or more PLMNs may configure WTRUs with different priority levels/PPP levels for each PC5-S message. A ProSe layer may pass on a corresponding preconfigured priority level for a message to the access stratum layer in the WTRU, for example, when the ProSe layer generates a PC5-S message." and insert the same on Column 28, Line 39, as a continuation of the same paragraph.

Column 30, Line 49: After "may" insert -- be --

In the Claims

Column 31, Line 65, In Claim 1: After "transmission" delete "of the data"

Signed and Sealed this
Fifteenth Day of August, 2023

Katherine Kelly Vidal
*Director of the United States Patent and Trademark Office*